US010497236B2

(12) United States Patent
Lemberger et al.

(10) Patent No.: US 10,497,236 B2
(45) Date of Patent: Dec. 3, 2019

(54) ADJUSTABLE ALERT TONES AND OPERATIONAL MODES FOR AUDIO/VIDEO RECORDING AND COMMUNICATION DEVICES BASED UPON USER LOCATION

(71) Applicant: A9.Com, Inc., Palo Alto, CA (US)

(72) Inventors: Elliott Lemberger, Santa Monica, CA (US); James Siminoff, Pacific Palisades, CA (US)

(73) Assignee: A9.Com, Inc., Palo Alto, CA (US)

( * ) Notice: Subject to any disclaimer, the term of this patent is extended or adjusted under 35 U.S.C. 154(b) by 0 days.

(21) Appl. No.: 15/936,399

(22) Filed: Mar. 26, 2018

(65) Prior Publication Data

US 2018/0286201 A1 Oct. 4, 2018

Related U.S. Application Data

(60) Provisional application No. 62/477,977, filed on Mar. 28, 2017.

(51) Int. Cl.

| | |
|---|---|
| ***H04N 5/77*** | (2006.01) |
| ***H04N 9/80*** | (2006.01) |
| ***G08B 13/196*** | (2006.01) |
| ***H04W 60/04*** | (2009.01) |
| ***H04W 4/02*** | (2018.01) |
| *H04W 8/00* | (2009.01) |

(52) U.S. Cl.

CPC . *G08B 13/19669* (2013.01); *G08B 13/19606* (2013.01); *H04W 4/023* (2013.01); *H04W 60/04* (2013.01); *H04W 8/005* (2013.01)

(58) Field of Classification Search

CPC ....... G08B 13/19669; G08B 13/19606; H04W 4/023; H04W 60/04

USPC ................ 386/228, 227, 224, 226, 230, 248

See application file for complete search history.

(56) References Cited

U.S. PATENT DOCUMENTS

| | | | |
|---|---|---|---|
| 4,764,953 | A | 8/1988 | Chern et al. |
| 5,428,388 | A | 6/1995 | von Bauer et al. |
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |

(Continued)

FOREIGN PATENT DOCUMENTS

| | | |
|---|---|---|
| CN | 2585521 | 11/2003 |
| CN | 2792061 | 6/2006 |

(Continued)

OTHER PUBLICATIONS

PCT Search Report and Written Opinion dated Jul. 11, 2018 for PCT application No. PCT/US2018/024410, 30 pages.

(Continued)

*Primary Examiner* — Robert Chevalier

(74) *Attorney, Agent, or Firm* — Lee & Hayes, P.C.

(57) ABSTRACT

An audio/video (A/V) recording and communication device includes a camera. A method sets a first operational mode for the A/V device. The method determines whether a registered user of the A/V device is within a predetermined proximity of the A/V device. Upon determining that the registered user of the A/V device is not within the predetermined proximity of the A/V device, the method sets a second operational mode for the A/V device.

23 Claims, 25 Drawing Sheets

B200 A/V Recording and Communication Device Detects Visitor and Captures Video Images and/or Audio B202 Communication Module of A/V Recording and Communication Device Sends Connection Request to Network Device B204 Network Device Connects A/V Recording and Communication Device to User's Client Device B206 A/V Recording and Communication Device Records Audio and/or Video B208 A/V Recording and Communication Device Transmits Audio and/or Video to User's Client Device B210 User Receives Notification on Client Device with Prompt to Accept or Deny Call B212 Call Accepted or Denied ?

Accepted

B218 User Communicates with Visitor Through User's Client Device with Streaming Audio and/or Video Denied B214 Audio and/or Video Recorded and Stored at Cloud Server B216 End

(56) References Cited

U.S. PATENT DOCUMENTS

| | | | | |
|---|---|---|---|---|
| 6,456,322 | B1 | 9/2002 | Marinacci | |
| 6,476,858 | B1 | 11/2002 | Ramirez Diaz et al. | |
| 6,633,231 | B1 | 10/2003 | Okamoto et al. | |
| 6,658,091 | B1 | 12/2003 | Naidoo et al. | |
| 6,753,774 | B2 | 6/2004 | Pan et al. | |
| 6,970,183 | B1 | 11/2005 | Monroe | |
| 7,062,291 | B2 | 6/2006 | Ryley et al. | |
| 7,065,196 | B2 | 6/2006 | Lee | |
| 7,085,361 | B2 | 8/2006 | Thomas | |
| 7,109,860 | B2 | 9/2006 | Wang | |
| 7,168,047 | B1 * | 1/2007 | Huppi | G06F 3/03543 345/165 |
| 7,193,644 | B2 | 3/2007 | Carter | |
| 7,304,572 | B2 | 12/2007 | Sheynman et al. | |
| 7,382,249 | B2 | 6/2008 | Fancella | |
| 7,450,638 | B2 | 11/2008 | Iwamura | |
| 7,643,056 | B2 | 1/2010 | Silsby | |
| 7,683,924 | B2 | 3/2010 | Oh et al. | |
| 7,683,929 | B2 | 3/2010 | Elazar et al. | |
| 7,738,917 | B2 | 6/2010 | Ryley et al. | |
| 8,139,098 | B2 | 3/2012 | Carter | |
| 8,144,183 | B2 | 3/2012 | Carter | |
| 8,154,581 | B2 | 4/2012 | Carter | |
| 8,428,782 | B2 | 4/2013 | Imes | |
| 8,619,136 | B2 | 12/2013 | Howarter et al. | |
| 8,780,201 | B1 | 7/2014 | Scalisi et al. | |
| 8,823,795 | B1 | 9/2014 | Scalisi et al. | |
| 8,842,180 | B1 | 9/2014 | Kasmir et al. | |
| 8,872,915 | B1 | 10/2014 | Scalisi et al. | |
| 8,937,659 | B1 | 1/2015 | Scalisi et al. | |
| 8,941,736 | B1 | 1/2015 | Scalisi | |
| 8,947,530 | B1 | 2/2015 | Scalisi | |
| 8,953,040 | B1 | 2/2015 | Scalisi et al. | |
| 9,013,575 | B2 | 4/2015 | Scalisi | |
| 9,049,352 | B2 | 6/2015 | Scalisi et al. | |
| 9,053,622 | B2 | 6/2015 | Scalisi | |
| 9,058,738 | B1 | 6/2015 | Scalisi | |
| 9,060,103 | B2 | 6/2015 | Scalisi | |
| 9,060,104 | B2 | 6/2015 | Scalisi | |
| 9,065,987 | B2 | 6/2015 | Kasmir et al. | |
| 9,094,584 | B2 | 7/2015 | Scalisi et al. | |
| 9,113,051 | B1 | 8/2015 | Scalisi | |
| 9,113,052 | B1 | 8/2015 | Scalisi et al. | |
| 9,118,819 | B1 | 8/2015 | Scalisi et al. | |
| 9,142,214 | B2 | 9/2015 | Scalisi | |
| 9,160,987 | B1 | 10/2015 | Kasmir et al. | |
| 9,165,444 | B2 | 10/2015 | Scalisi | |
| 9,172,920 | B1 | 10/2015 | Kasmir et al. | |
| 9,172,921 | B1 | 10/2015 | Scalisi et al. | |
| 9,172,922 | B1 | 10/2015 | Kasmir et al. | |
| 9,179,107 | B1 | 11/2015 | Scalisi et al. | |
| 9,179,108 | B1 | 11/2015 | Scalisi et al. | |
| 9,179,109 | B1 | 11/2015 | Kasmir et al. | |
| 9,196,133 | B2 | 11/2015 | Scalisi et al. | |
| 9,197,867 | B1 | 11/2015 | Scalisi et al. | |
| 9,230,424 | B1 | 1/2016 | Scalisi et al. | |
| 9,237,318 | B2 | 1/2016 | Kasmir et al. | |
| 9,247,219 | B2 | 1/2016 | Kasmir et al. | |
| 9,253,455 | B1 | 2/2016 | Harrison et al. | |
| 9,342,936 | B2 | 5/2016 | Scalisi | |
| 9,508,239 | B1 | 11/2016 | Harrison et al. | |
| 9,736,284 | B2 | 8/2017 | Scalisi et al. | |
| 9,743,049 | B2 | 8/2017 | Scalisi et al. | |
| 9,769,435 | B2 | 9/2017 | Scalisi et al. | |
| 9,786,133 | B2 | 10/2017 | Harrison et al. | |
| 9,799,183 | B2 | 10/2017 | Harrison et al. | |
| 2002/0094111 | A1 | 7/2002 | Puchek et al. | |
| 2002/0147982 | A1 | 10/2002 | Naidoo et al. | |
| 2003/0043047 | A1 | 3/2003 | Braun | |
| 2004/0085205 | A1 | 5/2004 | Yeh | |
| 2004/0085450 | A1 | 5/2004 | Stuart | |
| 2004/0086093 | A1 | 5/2004 | Schranz | |
| 2004/0095254 | A1 | 5/2004 | Maruszczak | |
| 2004/0135686 | A1 | 7/2004 | Parker | |
| 2005/0111660 | A1 | 5/2005 | Hosoda | |
| 2006/0010199 | A1 | 1/2006 | Brailean et al. | |
| 2006/0022816 | A1 | 2/2006 | Yukawa | |
| 2006/0139449 | A1 | 6/2006 | Cheng et al. | |
| 2006/0156361 | A1 | 7/2006 | Wang et al. | |
| 2007/0008081 | A1 | 1/2007 | Tylicki et al. | |
| 2010/0225455 | A1 | 9/2010 | Claiborne et al. | |
| 2011/0072501 | A1 * | 3/2011 | Fukui | H04L 9/3226 726/8 |
| 2012/0044050 | A1 | 2/2012 | Vig et al. | |
| 2013/0057695 | A1 | 3/2013 | Huisking | |
| 2014/0267716 | A1 | 9/2014 | Child et al. | |
| 2015/0035987 | A1 | 2/2015 | Fernandez | |
| 2015/0072674 | A1 | 3/2015 | Shoemaker et al. | |
| 2015/0109128 | A1 | 4/2015 | Fadell et al. | |
| 2015/0156030 | A1 | 6/2015 | Fadell et al. | |
| 2015/0163463 | A1 | 6/2015 | Hwang et al. | |
| 2015/0279198 | A1 * | 10/2015 | Gu | G08B 13/19656 340/541 |
| 2016/0189503 | A1 | 6/2016 | Johnson et al. | |
| 2016/0231718 | A1 | 8/2016 | Logan et al. | |
| 2016/0284206 | A1 | 9/2016 | Boettcher et al. | |
| 2016/0343237 | A1 | 11/2016 | Herman et al. | |
| 2016/0366373 | A1 | 12/2016 | Siminoff et al. | |
| 2017/0024996 | A1 | 1/2017 | Nold | |
| 2017/0111555 | A1 * | 4/2017 | Davis | A45F 5/02 |

FOREIGN PATENT DOCUMENTS

| | | |
|---|---|---|
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005135230 | 5/2005 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |
| WO | WO2016178015 | 11/2016 |

OTHER PUBLICATIONS

"Location Automation: A deeper look at Alarm.com's Geo-Services", Alarm.com, Feb. 10, 2015, retrieved on May 6, 2019 at «http://www.alarm.com/blog/geo-services-location-automation», 7 pages.

Sakevich, Joesph, "Geo-Fence Initiated Adjustments to Video Doorbell Alert Settings", Patent Search Report, dated Jan. 10, 2017, 14 pages.

"Use Your Smartphone as a Presence Sensor", Jan. 24, 2014, retrieved on May 6, 2019 at «https://blog.smartthings.com/how-to/use-your-smartphone-as-a-presence-sensor/», 8 pages.

* cited by examiner

ADJUSTABLE ALERT TONES AND OPERATIONAL MODES FOR AUDIO/VIDEO RECORDING AND COMMUNICATION DEVICES BASED UPON USER LOCATION

CROSS-REFERENCE TO A RELATED APPLICATION

This application claims priority to provisional application Ser. No. 62/477,977, filed on Mar. 28, 2017. The entire contents of the priority application are hereby incorporated by reference in its entirety as if fully set forth.

TECHNICAL FIELD

The present embodiments relate to audio/video (A/V) recording and communication devices, including A/V recording and communication doorbell systems. In particular, the present embodiments relate to improvements in the functionality of A/V recording and communication devices that enhance the ability to set operational modes, notifications, and alert tones, and to take certain actions dependent upon the proximity of one or more users of such devices.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication doorbell systems provide this functionality, and can also aid in crime detection and prevention. For example, audio and/or video captured by an A/V recording and communication doorbell can be uploaded to the cloud and recorded on a remote server. Subsequent review of the A/V footage can aid law enforcement in capturing perpetrators of home burglaries and other crimes. Further, the presence of an A/V recording and communication doorbell at the entrance to a home acts as a powerful deterrent against would-be burglars.

SUMMARY

The various embodiments of the present adjustable alert tones and operational modes for audio/video recording and communication devices based upon user location have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that in current audio/video (A/V) recording and communication devices (e.g., doorbells) other than the present embodiments, users of such devices would benefit from as great a flexibility as possible regarding their options for setting notifications and alert tones. Further, users would benefit from the capability to set different alert tones, and have their A/V recording and communication devices assume different operational modes, and thus perform different tasks, or provide different alerts, depending upon whether the user is present or absent from the home (or other location where the A/V recording and communication device is installed). Still further, users would benefit from the capability to set different operational modes when secondary users, such as a spouse or child, are home alone, and to receive different notifications and/or alert tones when their loved ones are home alone.

In a first aspect, a method and apparatus is provided, the apparatus comprising an audio/video (A/V) recording and communication device with which a method may be practiced, the method comprising setting a first operational mode for the A/V recording and communication device, determining whether a registered user of the A/V recording and communication device is within a predetermined proximity of the A/V recording and communication device and upon determining that the registered user of the A/V recording and communication device is not within the predetermined proximity of the A/V recording and communication device, setting a second operational mode for the A/V recording and communication device.

In another embodiment of the first aspect, determining whether the registered user of the A/V recording and communication device is within the predetermined proximity of the A/V recording and communication device comprises registering a wireless client device associated with the registered user to the A/V recording and communication device and determining whether the wireless client device is within the predetermined proximity of the A/V recording and communication device.

In another embodiment of the first aspect, the wireless client device is at least one of a smartphone and a wearable device.

In another embodiment of the first aspect, determining whether the wireless client device is within the predetermined proximity of the A/V recording and communication device comprises determining a location of the A/V recording and communication device, receiving GPS (Global Positioning System) location information from the wireless client device, and using the GPS location information and the location of the A/V recording and communication device to determine whether the wireless client device is within the predetermined proximity.

In another embodiment of the first aspect, determining whether the wireless client device is within the predetermined proximity of the A/V recording and communication device comprises receiving, at the A/V recording and communication device, a signal from the wireless client device; and using the receipt of the signal to determine that the wireless client device is within the predetermined proximity of the A/V recording and communication device.

In another embodiment of the first aspect, wherein the A/V recording and communication device comprises a camera having a field of view and wherein determining whether the registered user of the A/V recording and communication device is within the predetermined proximity of the A/V recording and communication device comprises uploading first image data of the registered user to a database that is accessible to the A/V recording and communication device, receiving second image data of a person within the field of view of the camera, and determining, by comparing the first image data and the second image data, whether the person is the registered user.

In another embodiment of the first aspect, the second operational mode comprises a heightened security mode.

In another embodiment of the first aspect, the heightened security mode comprises setting the camera to continuously record video images and, upon detecting any motion in the field of view of the A/V recording and communication device, sending an alert to a wireless client device that causes the wireless client device to play an audible tone that is uniquely associated with a severity of the alert.

In a second aspect a method and apparatus is provided, the apparatus comprising an audio/video (A/V) recording and communication device with which a method may be practiced, the method comprising setting a first operational mode for the A/V recording and communication device, determining whether a primary registered user of the A/V recording and communication device is within a predetermined proximity of the A/V recording and communication device, determining whether at least one secondary registered user of the A/V recording and communication device is within the predetermined proximity of the A/V recording and communication device, and upon determining that the primary registered user is outside of the predetermined proximity and that the at least one secondary registered user is inside the predetermined proximity, setting a second operational mode for the A/V recording and communication device.

In an embodiment of the second aspect, determining whether the primary registered user and the at least one secondary registered user are within the predetermined proximity of the A/V recording and communication device comprises registering a first wireless client device associated with the primary registered user to the A/V recording and communication device, registering a second wireless client device associated with the at least one secondary registered user to the A/V recording and communication device, determining whether the first wireless client device is within the predetermined proximity of the A/V recording and communication device, and determining whether the second wireless client device is within the predetermined proximity of the A/V recording and communication device.

In another embodiment of the second aspect, at least one of the first wireless client device and the second wireless client device is a smartphone.

In another embodiment of the second aspect, the second wireless client device is a wearable device.

In another embodiment of the second aspect, determining whether the first wireless client device and the second wireless device are each within the predetermined proximity of the A/V recording and communication device comprises determining a location of the A/V recording and communication device, receiving GPS (Global Positioning System) location information from the first wireless client device, using the GPS location information from the first wireless client device and the location of the A/V recording and communication device to determine whether the first wireless client device is within the predetermined proximity, receiving GPS location information from the second wireless client device, and using the GPS location information from the second wireless client device and the location of the A/V recording and communication device to determine whether the second wireless client device is within the predetermined proximity.

In another embodiment of the second aspect, determining whether the first wireless client device and the second wireless client device are each within the predetermined proximity of the A/V recording and communication device comprises receiving, at the A/V recording and communication device, a first signal from the first wireless client device, and using the receipt of the first signal to determine that the first wireless client device is within the predetermined proximity of the A/V recording and communication device, receiving, at the A/V recording and communication device, a second signal from the second wireless client device, and using the receipt of the second signal to determine that the second wireless client device is within the predetermined proximity of the A/V recording and communication device.

In another embodiment of the second aspect, the A/V recording and communication device is a video doorbell that enables a visitor to actuate a doorbell to send a notification to a wireless client device, and the method further comprises upon determining that neither the primary registered user nor any secondary registered user are within the predetermined proximity of the A/V recording and communication device, setting a third operational mode for the A/V recording and communication device, and upon actuation of the doorbell, generating and transmitting a unique priority alert to a first wireless client device associated with the primary registered user.

In a third aspect an audio/video (A/V) recording and communication device apparatus is provided, comprising a camera configured to capture image data of an object within a field of view of the camera, a communication module, and a processing module operatively connected to the camera and to the communication module, the processing module comprising a processor and a camera application, wherein the camera application configures the processor to set a first operational mode for the A/V recording and communication device, determine whether a registered user of the A/V recording and communication device is within a predetermined proximity of the A/V recording and communication device, and upon determining that the registered user of the A/V recording and communication device is not within the predetermined proximity of the A/V recording and communication device, set a second operational mode for the A/V recording and communication device.

In a further embodiment of the third aspect, determining whether the registered user of the A/V recording and communication device is within the predetermined proximity of the A/V recording and communication device comprises registering a wireless client device associated with the registered user to the A/V recording and communication device, and determining whether the wireless client device is within the predetermined proximity of the A/V recording and communication device.

In a further embodiment of the third aspect, the wireless client device is at least one of a smartphone and a wearable device.

In a further embodiment of the third aspect, determining whether the wireless client device is within the predetermined proximity of the A/V recording and communication device comprises determining the location of the A/V recording and communication device, receiving GPS (Global Positioning System) location information from the wireless client device and using the GPS location information and the location of the A/V recording and communication device to determine whether the wireless client device is within the predetermined proximity.

In a further embodiment of the third aspect, determining whether the wireless client device is within the predetermined proximity of the A/V recording and communication device comprises receiving, at the A/V recording and communication device, a signal from the wireless client device and using the receipt of the signal to determine that the wireless client device is within the predetermined proximity of the A/V recording and communication device.

In a further embodiment of the third aspect, determining whether the registered user of the A/V recording and communication device is within the predetermined proximity of the A/V recording and communication device comprises uploading first image data of the registered user to a database that is accessible to the A/V recording and communication device, receiving second image data of a person within the field of view of the camera, and determining, by comparing the first image data and the second image data, whether the person is the registered user.

In a further embodiment of the third aspect, the second operational mode comprises a heightened security mode.

In a further embodiment of the third aspect, the heightened security mode comprises setting the camera to continuously record video images and upon detecting any motion in a field of view of the A/V recording and communication device, sending an alert to a wireless client device that causes the wireless client device to play an audible tone that is uniquely associated with a severity of the alert.

BRIEF DESCRIPTION OF THE DRAWINGS

The various embodiments of the present adjustable alert tones and operational modes for audio/video recording and communication devices based upon user location now will be discussed in detail with an emphasis on highlighting the advantageous features. These embodiments depict the novel and non-obvious methods, apparatus, and systems enabling the setting of customized operating modes, notifications, alert tones, monitoring, video recording, and actions for audio/video recording and communication devices shown in the accompanying drawings, which are for illustrative purposes only, using geolocation and other techniques to customize the behavior of the devices based on the locations of one or more users of the devices. These drawings include the following figures, in which like numerals indicate like parts.

DETAILED DESCRIPTION

Figure 1:
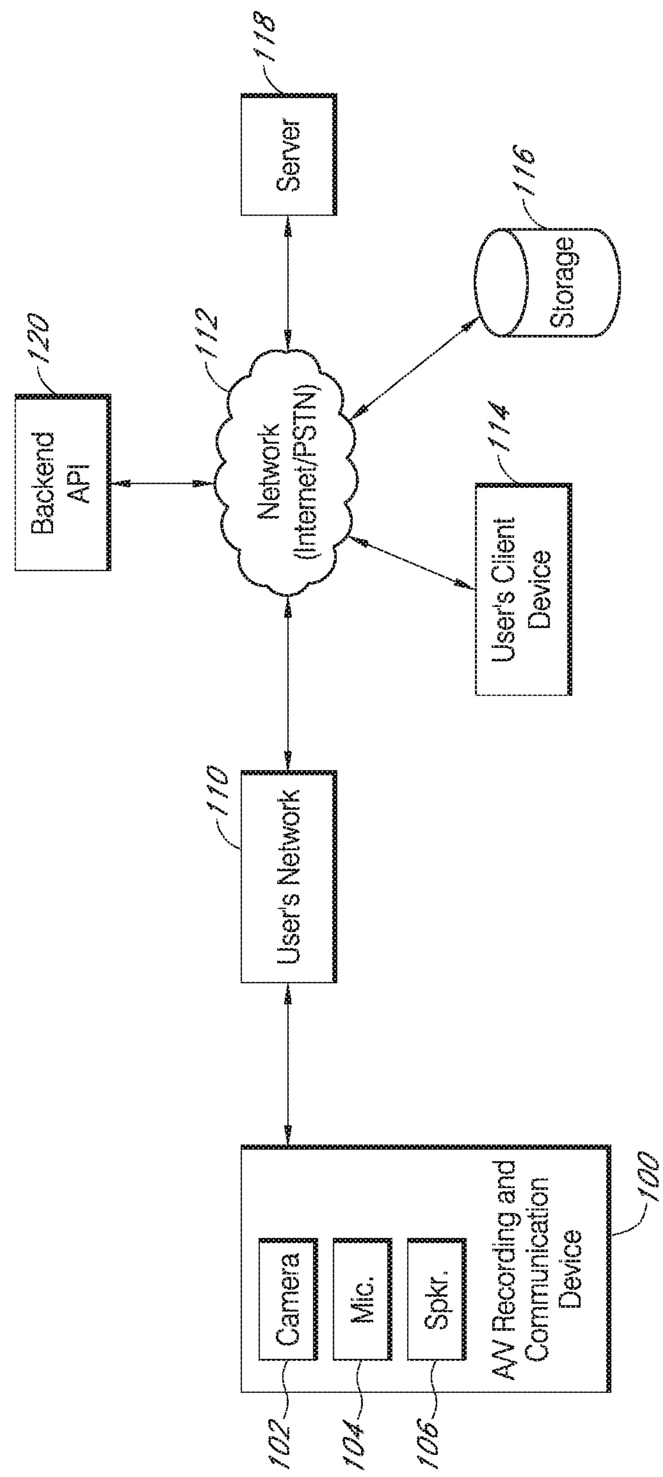
FIG. 1 is a functional block diagram illustrating one embodiment of a system including an A/V recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present adjustable alert tones and operational modes for audio/video recording and communication devices based upon user location are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device 100. The A/V recording and communication device 100 may in some embodiments comprise a doorbell, and may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
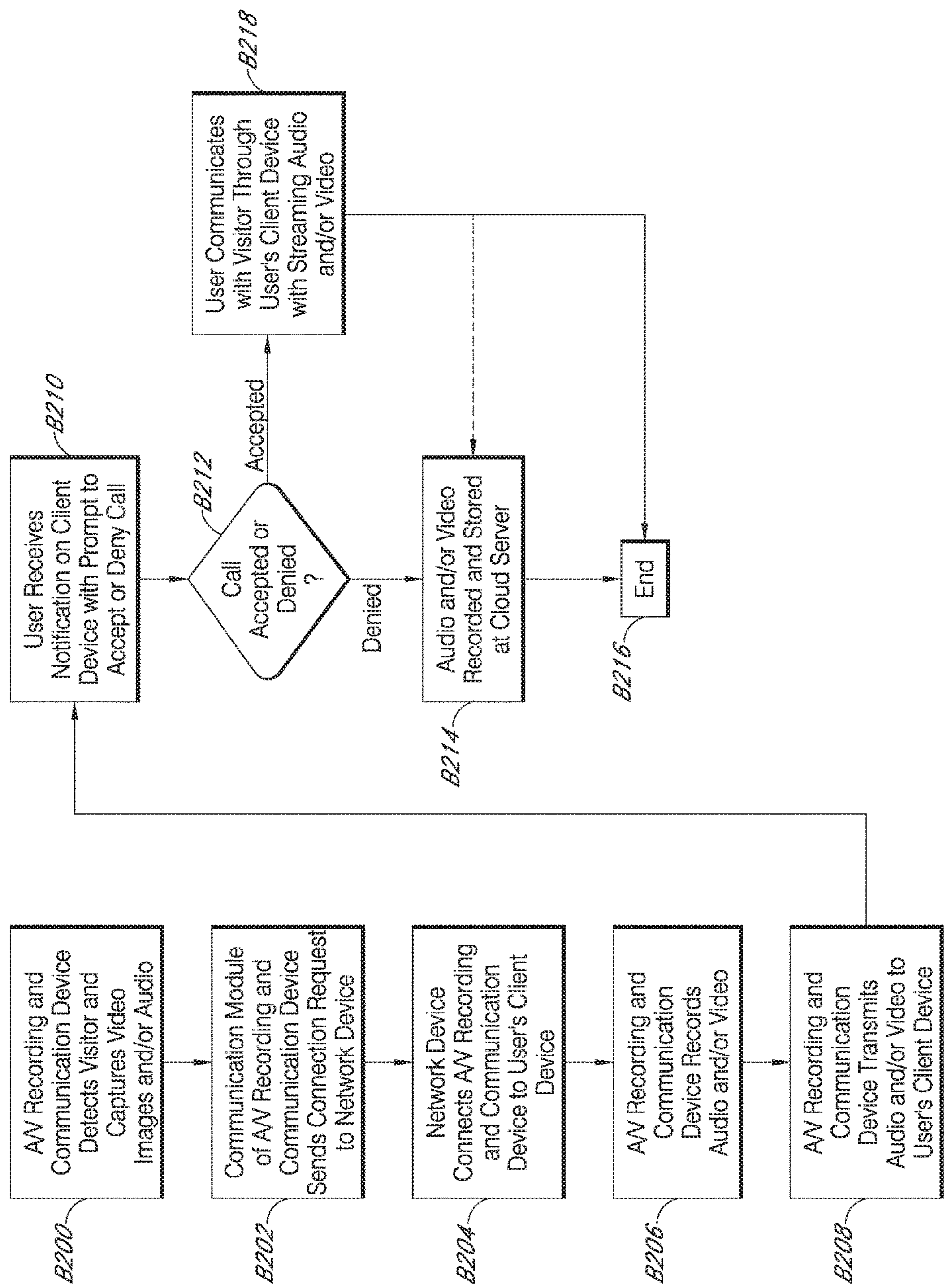
FIG. 2 is a flowchart illustrating one embodiment of a process for streaming and storing A/V content from an A/V recording and communication doorbell system according to various aspects of the present disclosure.

FIG. 2 is a flowchart illustrating a process for streaming and storing A/V content from an A/V recording and communication doorbell system according to various aspects of the present disclosure. At block B200, the A/V recording and communication device 100 detects the visitor's presence and begins capturing video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Many of today's homes include a wired doorbell system that does not have A/V communication capabilities. Instead, standard wired doorbell systems include a button outside the home next to the front door. The button activates a signaling device (such as a bell or a buzzer) inside the building. Pressing the doorbell button momentarily closes the doorbell circuit, which may be, for example, a single-pole, single-throw (SPST) push button switch. One terminal of the button is wired to a terminal on a transformer. The transformer steps down the 120-volt or 240-volt household AC electrical power to a lower voltage, typically 16 to 24 volts. Another terminal on the transformer is wired to a terminal on the signaling device. Another terminal on the signaling device is wired to the other terminal on the button. A common signaling device includes two flat metal bar resonators, which are struck by plungers operated by two solenoids. The flat bars are tuned to different notes. When the doorbell button is pressed, the first solenoid's plunger strikes one of the bars, and when the button is released, a spring on the plunger pushes the plunger up, causing it to strike the other bar, creating a two-tone sound ("ding-dong").

Many current A/V recording and communication doorbell systems (other than the present embodiments) are incompatible with existing wired doorbell systems of the type described in the preceding paragraph. One reason for this incompatibility is that the A/V recording and communication doorbell draws an amount of power from the household AC electrical power supply that is above the threshold necessary for causing the signaling device to sound. The A/V recording and communication doorbell thus causes frequent inadvertent sounding of the signaling device, which is not only bothersome to the home's occupant(s), but also undermines the usefulness of the doorbell. The present embodiments solve this problem by limiting the power consumption of the A/V recording and communication doorbell to an amount that is below the threshold necessary for causing the signaling device to sound. Embodiments of the present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact. Also because the camera is able to be powered on continuously, it can be used as a light sensor for use in controlling the current state of the IR cut filter and turning the IR LED on and off. Using the camera as a light sensor eliminates any need for a separate light sensor, thereby further simplifying the design of the A/V recording and communication doorbell and enabling the doorbell to be made even more compact.

Figure 3:
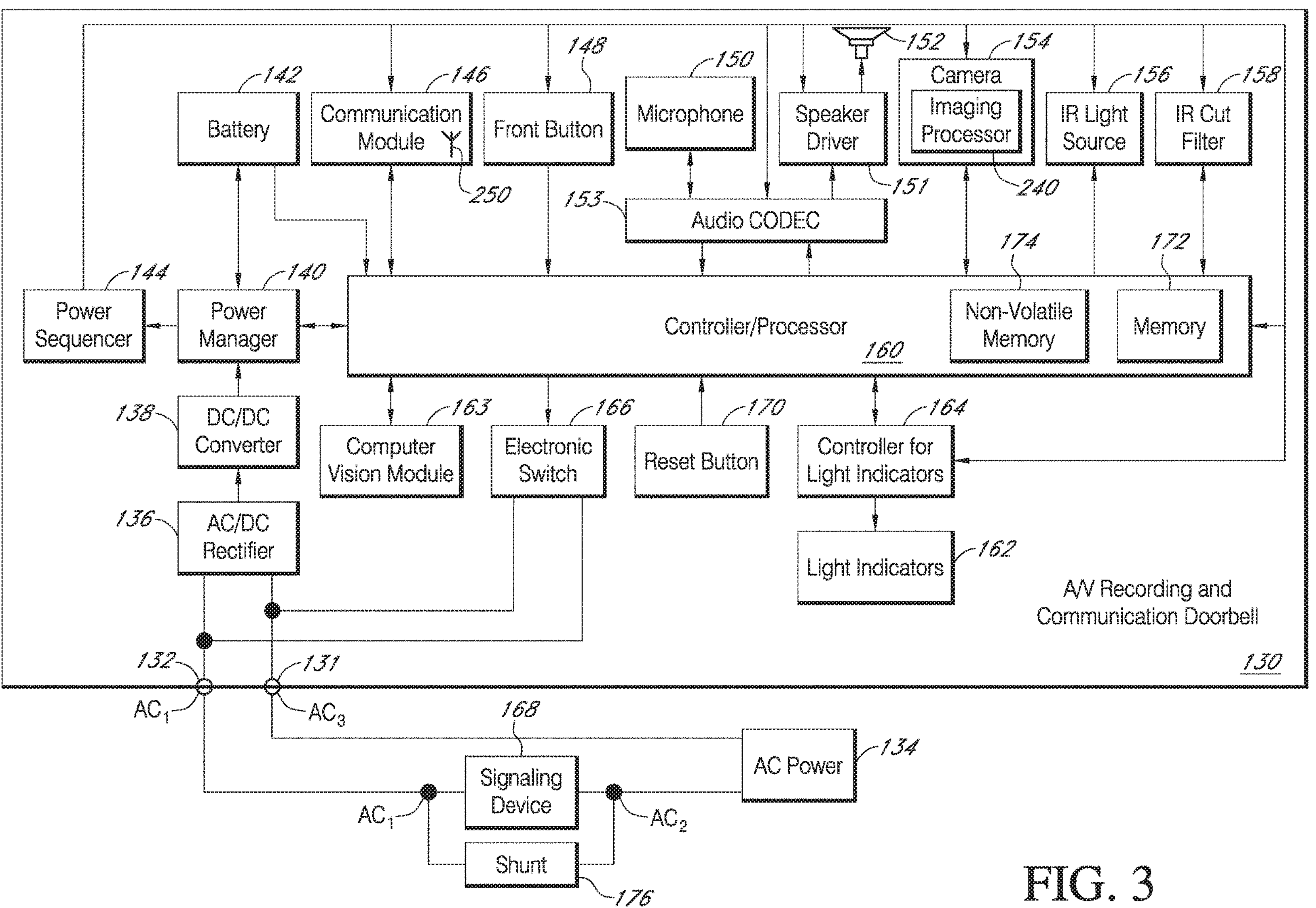
FIG. 3 is a functional block diagram illustrating an embodiment of an A/V recording and communication doorbell system according to the present disclosure.

FIGS. 3-13 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power 134 may have a voltage in the range of 16-24 VAC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the doorbell 130 therefore causes the signaling device 168 to sound, alerting any person(s) within the structure to which the doorbell 130 is mounted that there is a visitor at the front door (or at another location corresponding to the location of the doorbell 130). In one non-limiting example, the electronic switch 166 may be a triac device.

Figure 4:
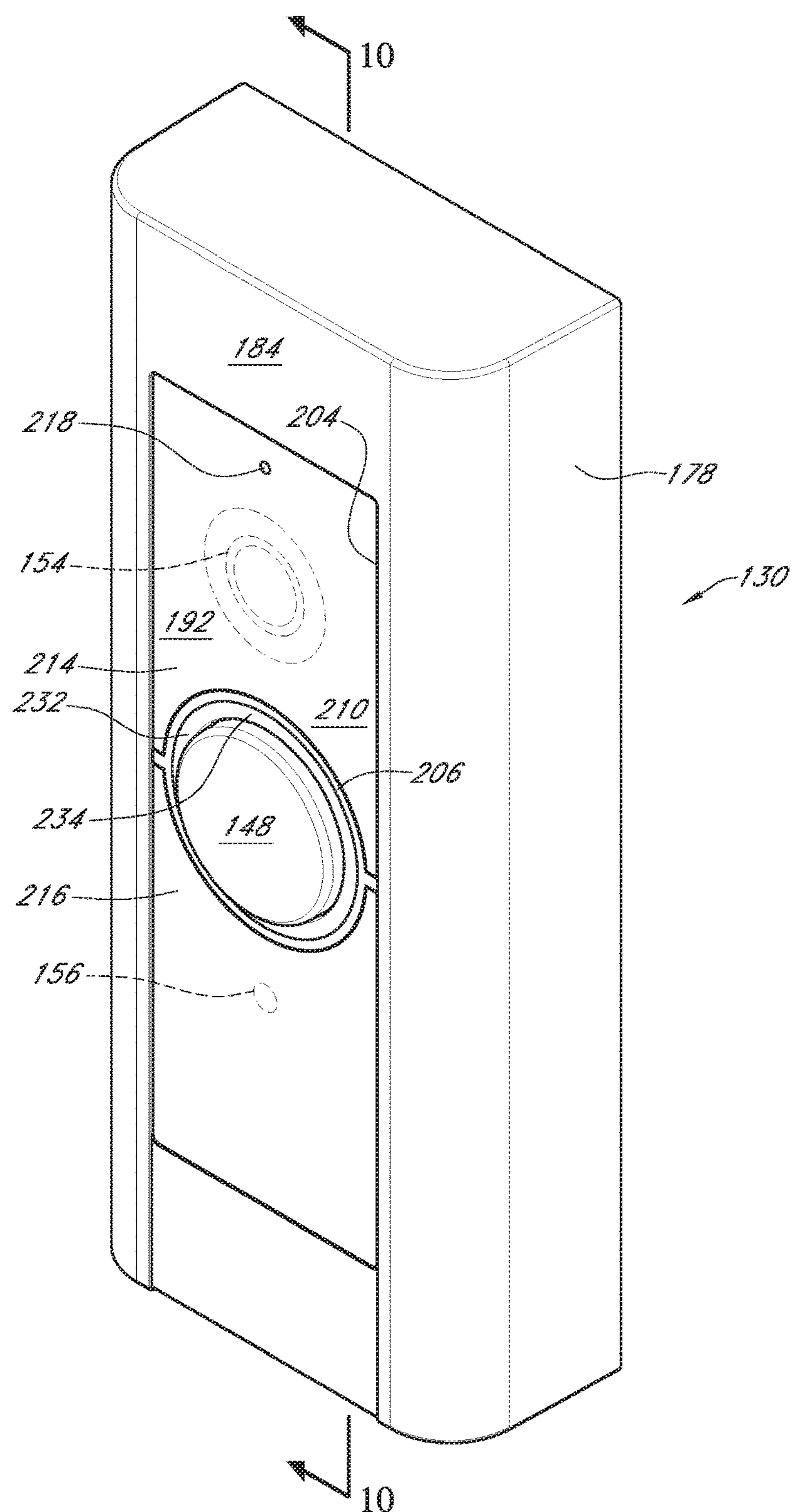
FIG. 4 is a front perspective view of an embodiment of an A/V recording and communication doorbell according to the present disclosure.
Figure 5:
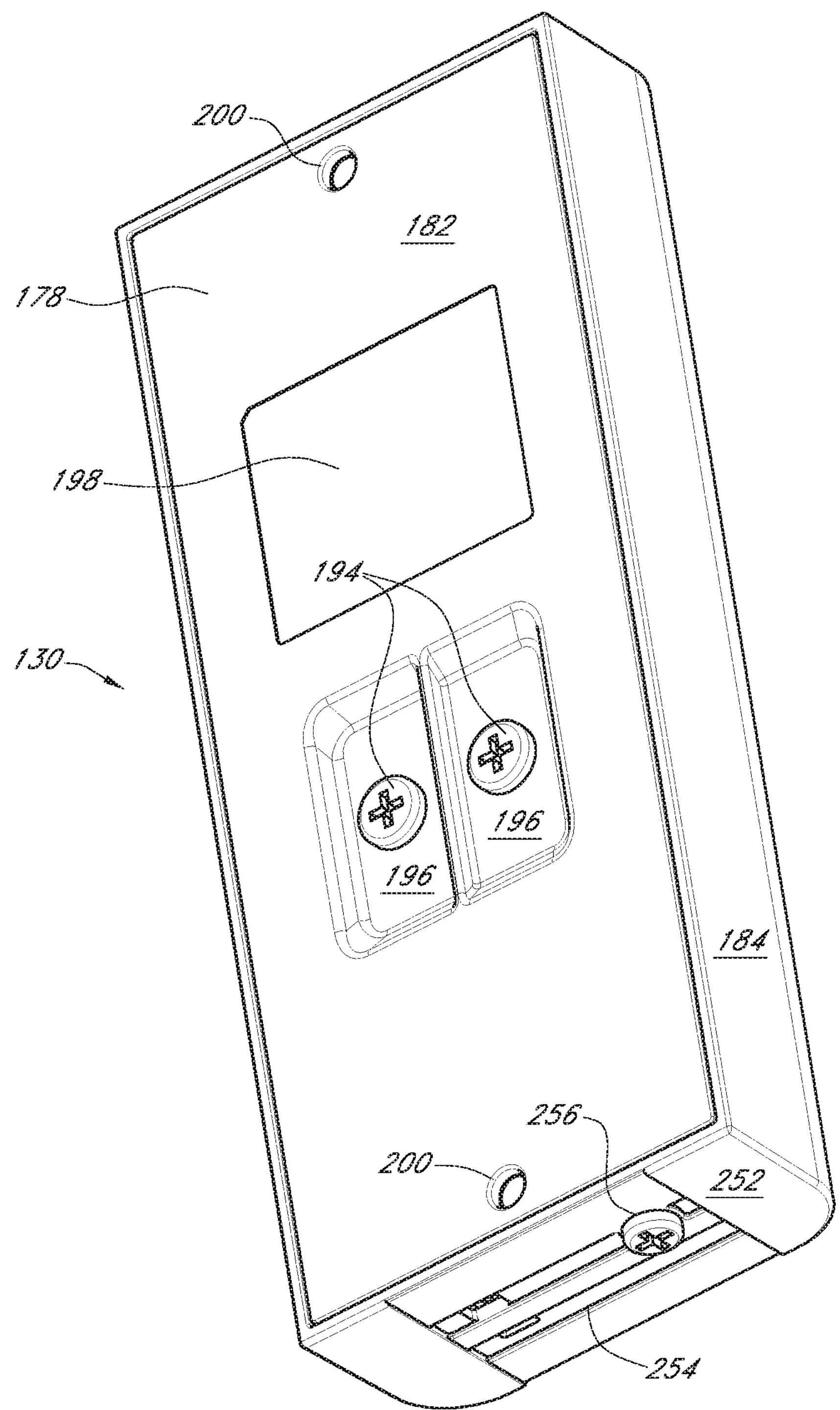
FIG. 5 is a rear perspective view of the A/V recording and communication doorbell of FIG. 4.
Figure 6:
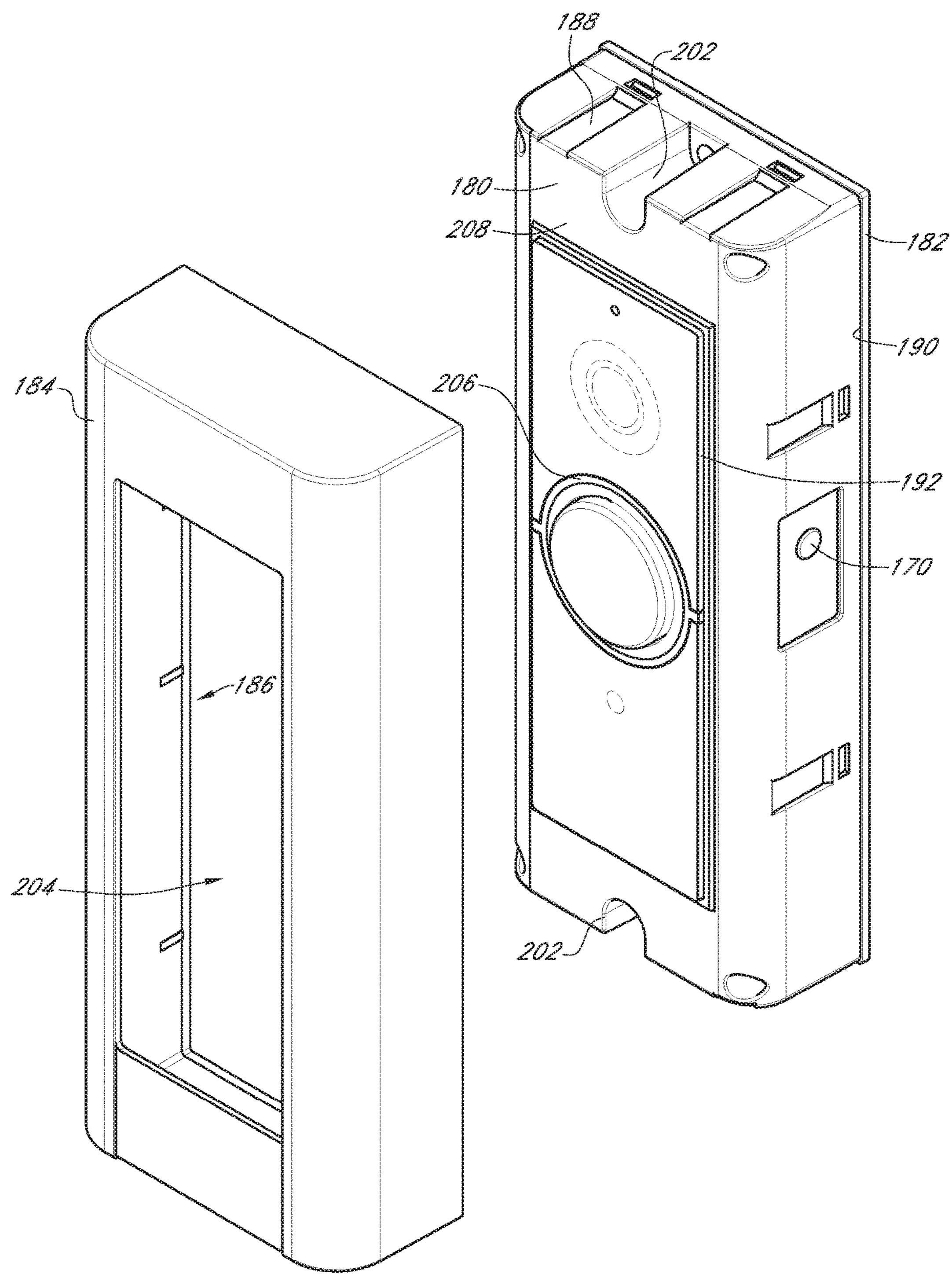
FIG. 6 is a partially exploded front perspective view of the A/V recording and communication doorbell of FIG. 4 showing the cover removed.

With reference to FIGS. 4-6, the A/V recording and communication doorbell 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication doorbell 130. For example, the A/V recording and communication doorbell 130 may be packaged and sold with multiple shells 184 in different colors in the same package.

With reference to FIG. 4, a front surface of the A/V recording and communication doorbell 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication doorbell 130. The terminal screws 194 are configured to receive electrical wires to connect to the A/V recording and communication doorbell 130, through the terminals 131, 132, to the household AC power supply 134 of the structure on which the A/V recording and communication doorbell 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication doorbell 130. The A/V recording and communication doorbell 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication doorbell 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication doorbell 130 may include a mounting plate or bracket (not shown) to facilitate securing the A/V recording and communication doorbell 130 to the mounting surface.

Figure 10:
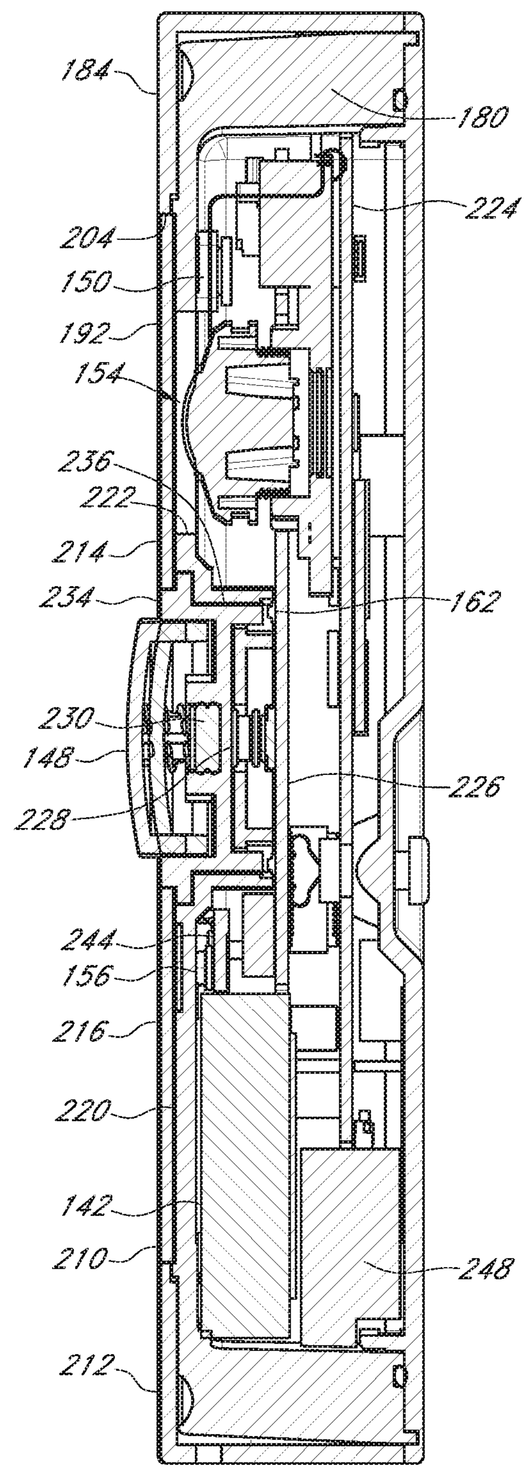
FIG. 10 is a right-side cross-sectional view of the A/V recording and communication doorbell of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate night vision functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
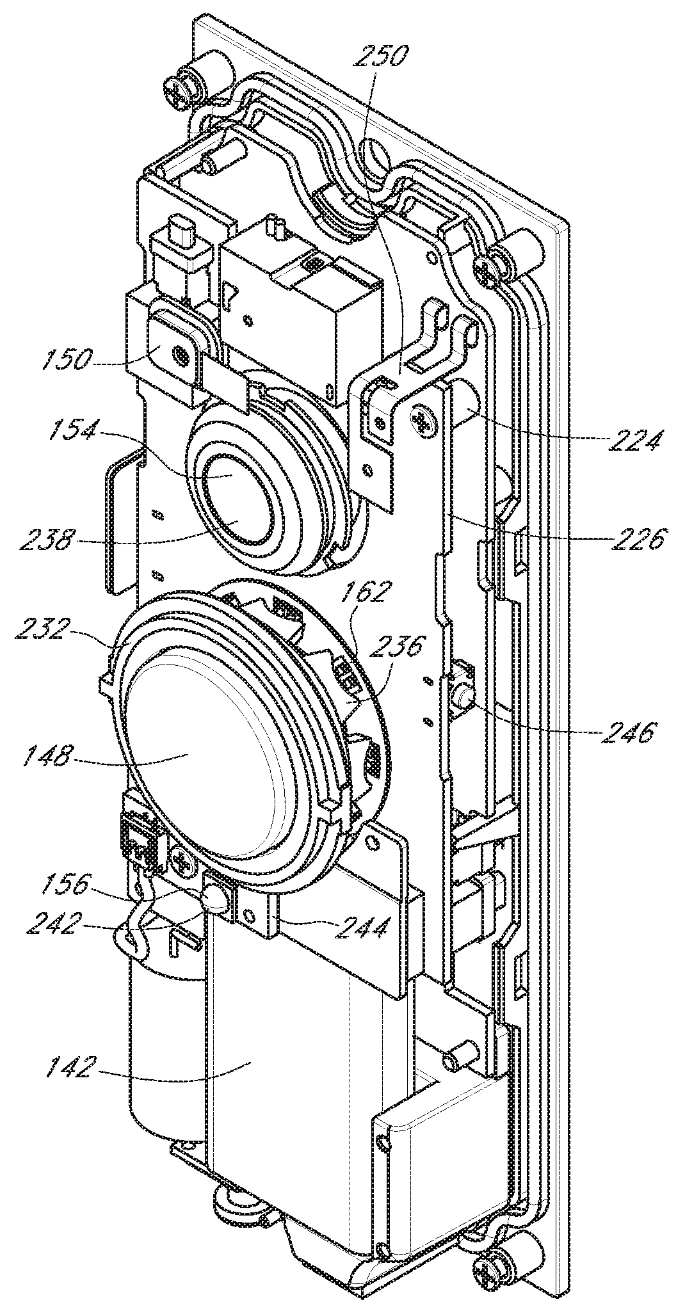
FIGS. 7, 8, and 9 are front perspective views of various internal components of the A/V recording and communication doorbell of FIG. 4.
Figure 8:
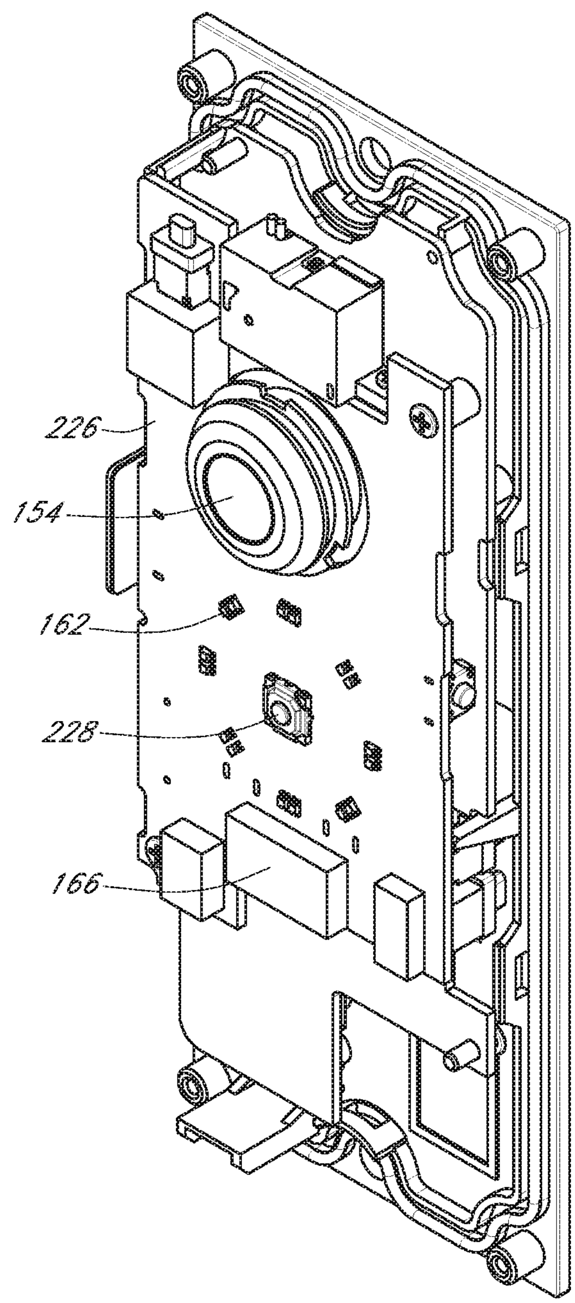
Figure 9:
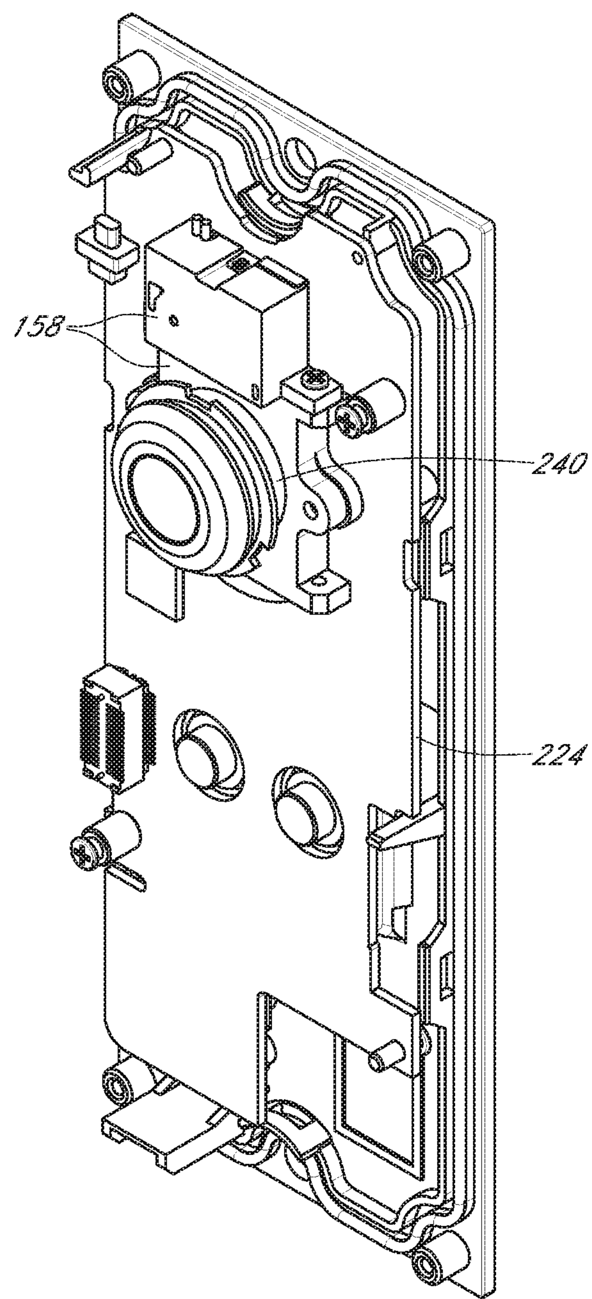

FIGS. 7-10 illustrate various internal components of the A/V recording and communication doorbell 130. FIGS. 7-9 are front perspective views of the doorbell 130 with the shell 184 and the enclosure 180 removed, while FIG. 10 is a right-side cross-sectional view of the doorbell 130 taken through the line 10-10 in FIG. 4. With reference to FIGS. 7 and 8, the A/V recording and communication doorbell 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the doorbell 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the doorbell 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless network is good, limited, poor, or not connected. The LEDs 162 may be used to guide the user through setup or installation steps using visual cues, potentially coupled with audio cues emitted from the speaker 152.

With further reference to FIG. 7, the A/V recording and communication doorbell 130 further comprises a rechargeable battery 142. As described in further detail below, the A/V recording and communication doorbell 130 is connected to an external power source 134 (FIG. 3), such as AC mains. The A/V recording and communication doorbell 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication doorbell 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication doorbell 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication doorbell 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication doorbell 130 can clearly capture images at night (may be referred to as "night vision").

With reference to FIG. 9, the A/V recording and communication doorbell 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light (night vision). In some embodiments, the camera 154 acts as a light sensor for use in controlling the current state of the IR cut filter 158 and turning the IR LED 242 on and off. Using the camera 154 as a light sensor is facilitated in some embodiments by the fact that the A/V recording and communication doorbell 130 is powered by a connection to AC mains, and the camera 154, therefore, is always powered on. In other embodiments, however, the A/V recording and communication doorbell 130 may include a light sensor separate from the camera 154 for use in controlling the IR cut filter 158 and the IR LED 242.

With reference back to FIG. 6, the A/V recording and communication doorbell 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160.

Figure 11:
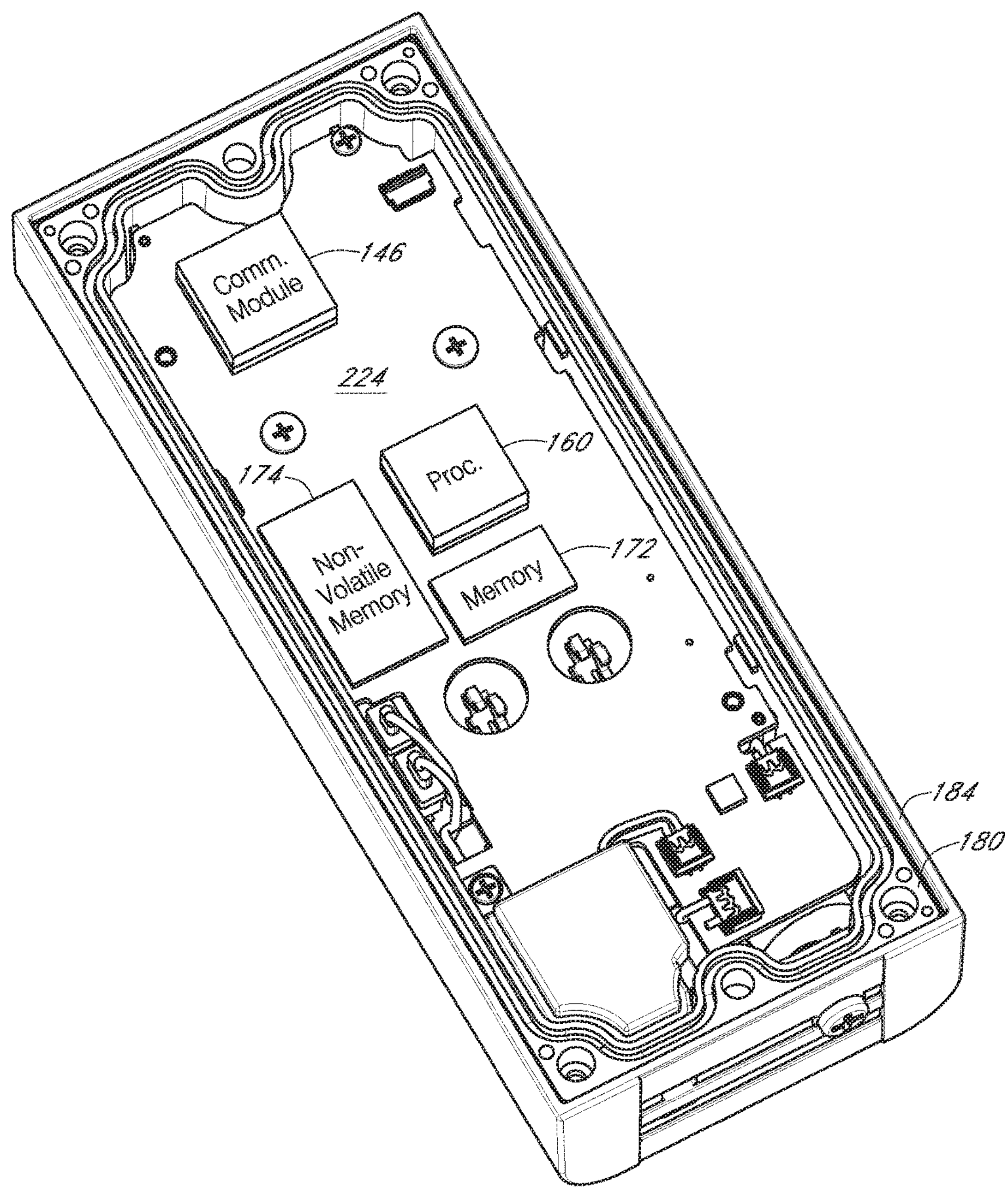
FIGS. 11-13 are rear perspective views of various internal components of the A/V recording and communication doorbell of FIG. 4.
Figure 12:
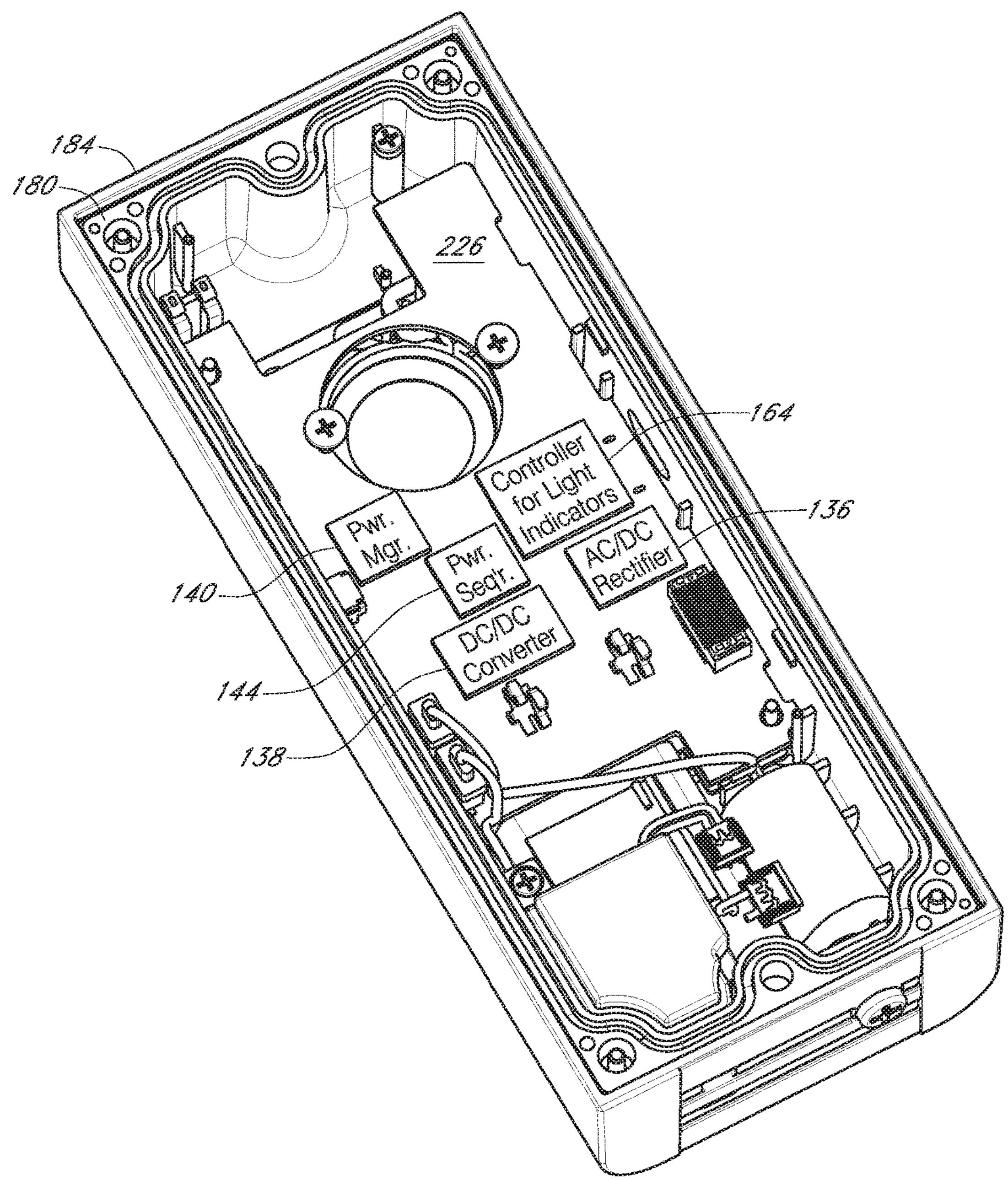
Figure 13:
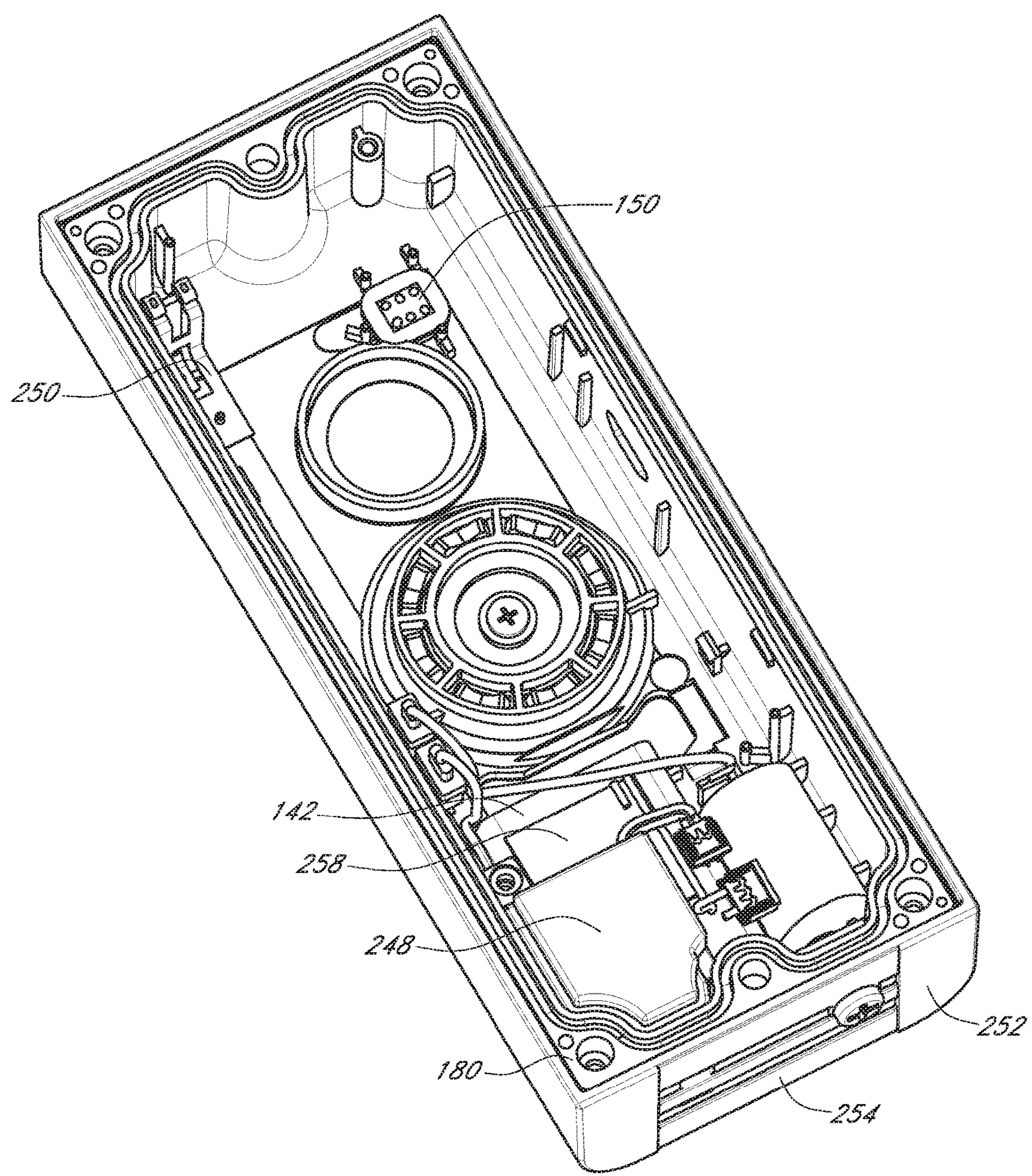

FIGS. 11-13 further illustrate internal components of the A/V recording and communication doorbell 130. FIGS. 11-13 are rear perspective views of the doorbell 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication doorbell 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication doorbell 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication doorbell 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the doorbell 130 is mounted to a mounting bracket (not shown), the security screw may also maintain the doorbell 130 on the mounting bracket.

With reference to FIG. 13, the A/V recording and communication doorbell 130 may further include a battery heater 258. The present A/V recording and communication doorbell 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As described above, the present embodiments advantageously limit the power consumption of the A/V recording and communication doorbell to an amount that is below the threshold necessary for causing the signaling device to sound (except when the front button of the doorbell is pressed). The present A/V recording and communication doorbell can thus be connected to the existing household AC power supply and the existing signaling device without causing inadvertent sounding of the signaling device.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion sensors, heat source sensors, etc. Also because the camera is able to be powered on continuously, it can be used as a light sensor for use in controlling the current state of the IR cut filter and turning the IR LED on and off. Using the camera as a light sensor eliminates any need for a separate light sensor, thereby further simplifying the design of the A/V recording and communication doorbell and enabling the doorbell to be made even more compact, although in some alternative embodiments the doorbell may include a separate light sensor.

Figure 14:
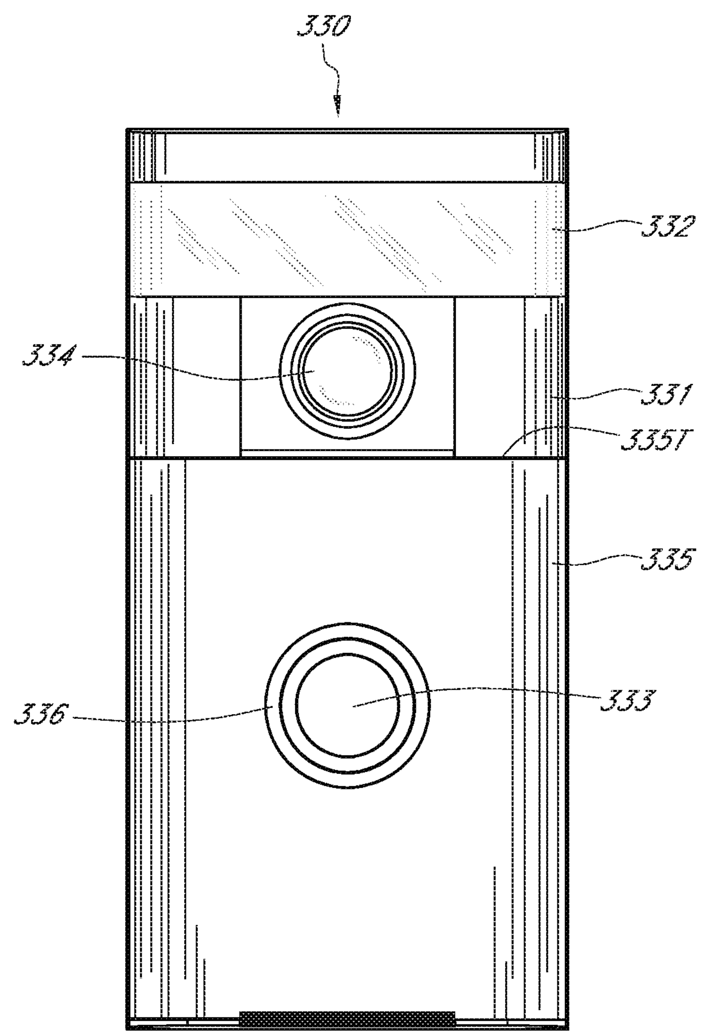
FIG. 14 is a front view of an A/V recording and communication device according to various aspects of the present disclosure.
Figure 15:
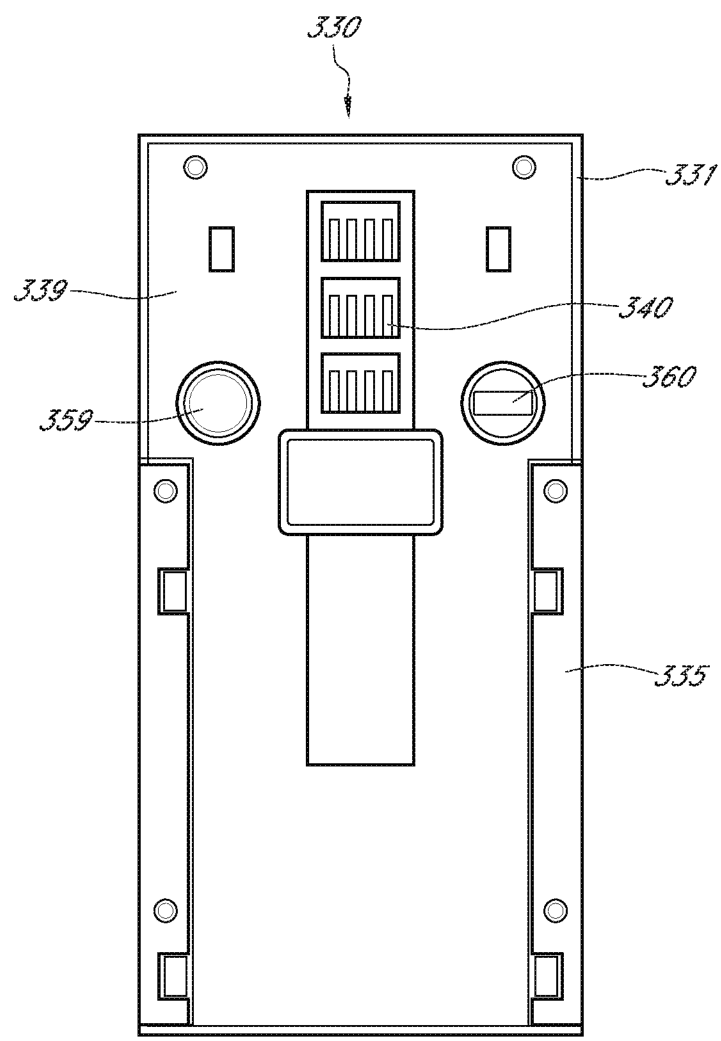
FIG. 15 is a rear view of the A/V recording and communication device of FIG. 14.
Figure 16:
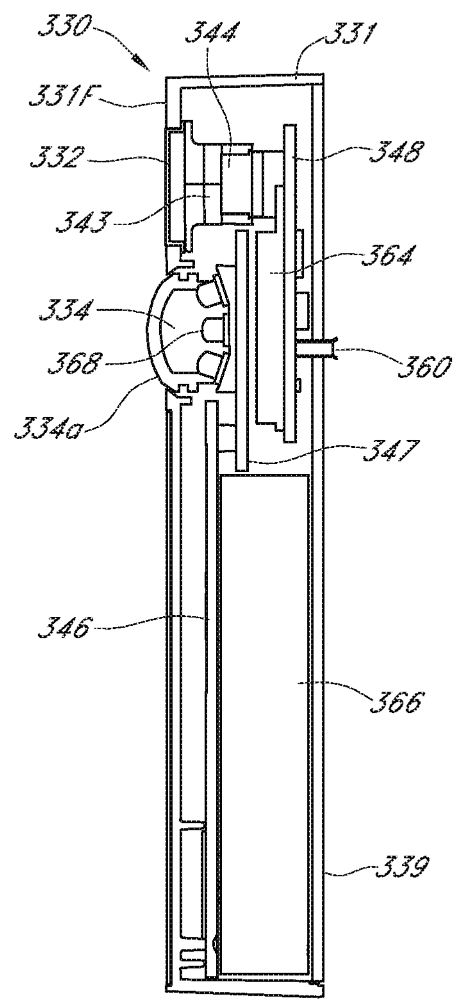
FIG. 16 is cross-sectional right side view of the A/V recording and communication device of FIG. 14.
Figure 17:
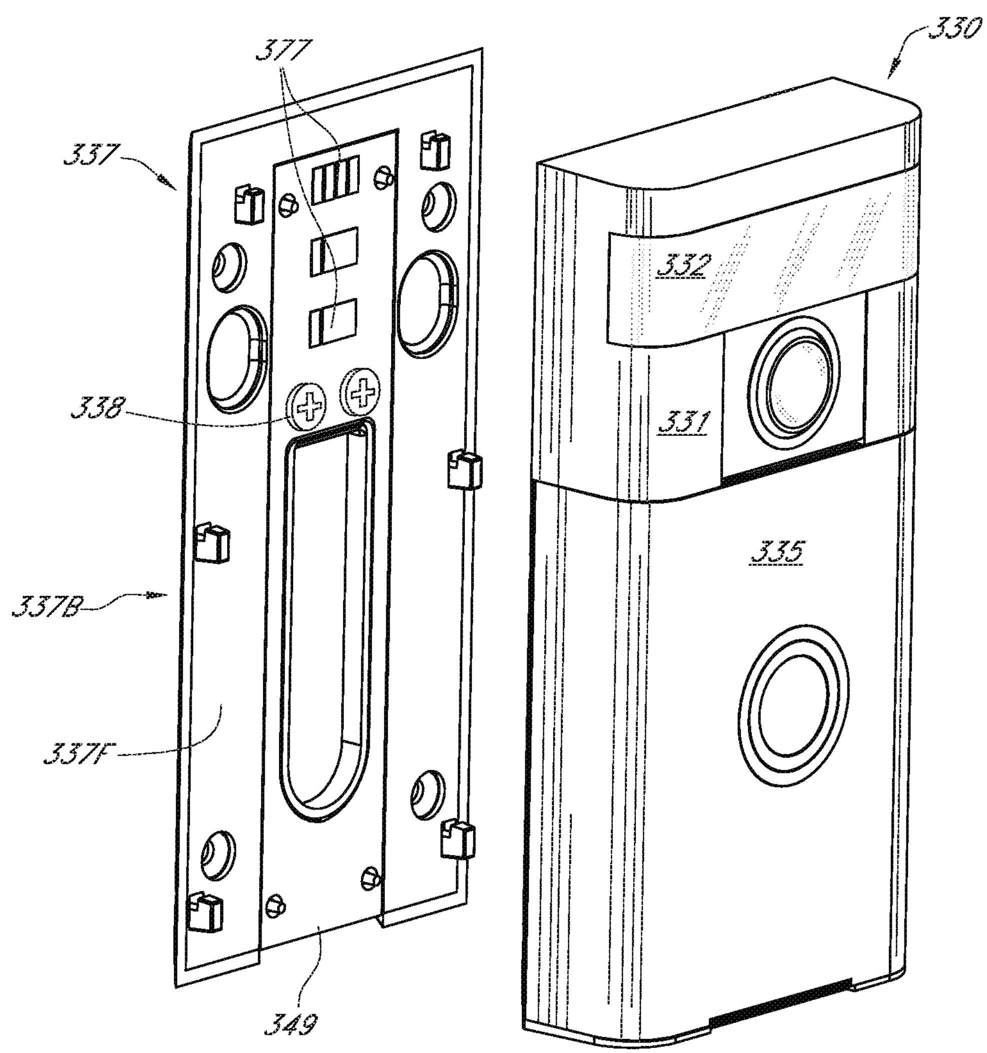
FIG. 17 is an exploded view of the A/V recording and communication device of FIG. 14 and a mounting bracket.

FIGS. 14-18 illustrate another embodiment of a wireless audio/video (A/V) communication doorbell 330 according to an aspect of present embodiments. FIG. 14 is a front view, FIG. 15 is a rear view, FIG. 16 is a right-side cross-sectional view, and FIG. 17 is an exploded view of the doorbell 330 and a mounting bracket 337. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate 339 (FIG. 15). With reference to FIG. 16, the faceplate 335 has a substantially flat profile. The faceplate 335 may comprise any suitable material, including, without limitation, metals, such as brushed aluminum or stainless steel, metal alloys, or plastics. The faceplate 335 protects the internal contents of the doorbell 330 and serves as an exterior front surface of the doorbell 330.

With reference to FIG. 14, the faceplate 335 includes a button 333 and a light pipe 336. The button 333 and the light pipe 336 may have various profiles that may or may not match the profile of the faceplate 335. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With reference to FIGS. 3 and 4, the doorbell 330 further includes an enclosure 331 that engages the faceplate 335. In the illustrated embodiment, the enclosure 331 abuts an upper edge 335T (FIG. 14) of the faceplate 335, but in alternative embodiments one or more gaps between the enclosure 331 and the faceplate 335 may facilitate the passage of sound and/or light through the doorbell 330. The enclosure 331 may comprise any suitable material, but in some embodiments the material of the enclosure 331 preferably permits infrared light to pass through from inside the doorbell 330 to the environment and vice versa. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

FIG. 15 is a rear view of the doorbell 330, according to an aspect of the present embodiments. As illustrated, the enclosure 331 may extend from the front of the doorbell 330 around to the back thereof and may fit snugly around a lip of the back plate 339. The back plate 339 may comprise any suitable material, including, without limitation, metals, such as brushed aluminum or stainless steel, metal alloys, or plastics. The back plate 339 protects the internal contents of the doorbell 330 and serves as an exterior rear surface of the doorbell 330. The faceplate 335 may extend from the front of the doorbell 330 and at least partially wrap around the back plate 339, thereby allowing a coupled connection between the faceplate 335 and the back plate 339. The back plate 339 may have indentations in its structure to facilitate the coupling.

With further reference to FIG. 15, spring contacts 340 may provide power to the doorbell 330 when mated with other conductive contacts connected to a power source. The spring contacts 340 may comprise any suitable conductive material, including, without limitation, copper, and may be capable of deflecting when contacted by an inward force, for example the insertion of a mating element. The doorbell 330 further comprises a connector 360, such as a micro-USB or other connector, whereby power and/or data may be supplied to and from the components within the doorbell 330. A reset button 359 may be located on the back plate 339, and may make contact with a button actuator (not shown) located within the doorbell 330 when the reset button 359 is pressed. When the reset button 359 is pressed, it may trigger one or more functions, as described below.

FIG. 16 is a right side cross-sectional view of the doorbell 330 without the mounting bracket 337. In the illustrated embodiment, the lens 332 is substantially coplanar with the front surface 331F of the enclosure 331. In alternative embodiments, the lens 332 may be recessed within the enclosure 331 or may protrude outward from the enclosure 331. The camera 334 is coupled to a camera printed circuit board (PCB) 347, and a lens 334*a* of the camera 334 protrudes through an opening in the enclosure 331. The camera lens 334*a* may be a lens capable of focusing light into the camera 334 so that clear images may be taken.

The camera PCB 347 may be secured within the doorbell with any suitable fasteners, such as screws, or interference connections, adhesives, etc. The camera PCB 347 comprises various components that enable the functionality of the camera 334 of the doorbell 330, as described below. Infrared light-emitting components, such as infrared LED's 368, are coupled to the camera PCB 347 and may be triggered to activate when a light sensor detects a low level of ambient light. When activated, the infrared LED's 368 may emit infrared light through the enclosure 331 and/or the camera 334 out into the ambient environment. The camera 334, which may be configured to detect infrared light, may then capture the light emitted by the infrared LED's 368 as it reflects off objects within the camera's 334 field of view, so that the doorbell 330 can clearly capture images at night (may be referred to as "night vision").

With continued reference to FIG. 16, the doorbell 330 further comprises a front PCB 346, which in the illustrated embodiment resides in a lower portion of the doorbell 330 adjacent a battery 366. The front PCB 346 may be secured within the doorbell 330 with any suitable fasteners, such as screws, or interference connections, adhesives, etc. The front PCB 346 comprises various components that enable the functionality of the audio and light components, as further described below. The battery 366 may provide power to the doorbell 330 components while receiving power from the spring contacts 340, thereby engaging in a trickle-charge method of power consumption and supply. Alternatively, the doorbell 330 may draw power directly from the spring contacts 340 while relying on the battery 366 only when the spring contacts 340 are not providing the power necessary for all functions. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360.

With continued reference to FIG. 16, the doorbell 330 further comprises a power PCB 348, which in the illustrated embodiment resides behind the camera PCB 347. The power PCB 348 may be secured within the doorbell 330 with any suitable fasteners, such as screws, or interference connections, adhesives, etc. The power PCB 348 comprises various components that enable the functionality of the power and device-control components, as further described below.

With continued reference to FIG. 16, the doorbell 330 further comprises a communication module 364 coupled to the power PCB 348. The communication module 364 facilitates communication with client devices in one or more remote locations, as further described below. The connector 360 may protrude outward from the power PCB 348 and extend through a hole in the back plate 339. The doorbell 330 further comprises passive infrared (PIR) sensors 344, which are secured on or within a PIR sensor holder 343, and the assembly resides behind the lens 332. In some embodiments, the doorbell 330 may comprise three PIR sensors 344, as further described below, but in other embodiments any number of PIR sensors 344 may be provided. The PIR sensor holder 343 may be secured to the doorbell 330 with any suitable fasteners, such as screws, or interference connections, adhesives, etc. The PIR sensors 344 may be any type of sensor capable of detecting and communicating the presence of a heat source within their field of view. Further, alternative embodiments may comprise one or more motion sensors either in place of or in addition to the PIR sensors 344. The motion sensors may be configured to detect motion using any methodology, such as a methodology that does not rely on detecting the presence of a heat source within a field of view.

FIG. 17 is an exploded view of the doorbell 330 and the mounting bracket 337 according to an aspect of the present embodiments. The mounting bracket 337 is configured to be mounted to a mounting surface (not shown) of a structure, such as a home or an office. FIG. 17 shows the front side 337F of the mounting bracket 337. The mounting bracket 337 is configured to be mounted to the mounting surface such that the back side 337B thereof faces the mounting surface. In certain embodiments, the mounting bracket 337 may be mounted to surfaces of various composition, including, without limitation, wood, concrete, stucco, brick, vinyl siding, aluminum siding, etc., with any suitable fasteners, such as screws, or interference connections, adhesives, etc. The doorbell 330 may be coupled to the mounting bracket 337 with any suitable fasteners, such as screws, or interference connections, adhesives, etc.

With continued reference to FIG. 17, the illustrated embodiment of the mounting bracket 337 includes the terminal screws 338. The terminal screws 338 are configured to receive electrical wires adjacent the mounting surface of the structure upon which the mounting bracket 337 is mounted, so that the doorbell 330 may receive electrical power from the structure's electrical system. The terminal screws 338 are electrically connected to electrical contacts 377 of the mounting bracket. If power is supplied to the terminal screws 338, then the electrical contacts 377 also receive power through the terminal screws 338. The electrical contacts 377 may comprise any suitable conductive material, including, without limitation, copper, and may protrude slightly from the face of the mounting bracket 337 so that they may mate with the spring contacts 340 located on the back plate 339.

Figure 18:
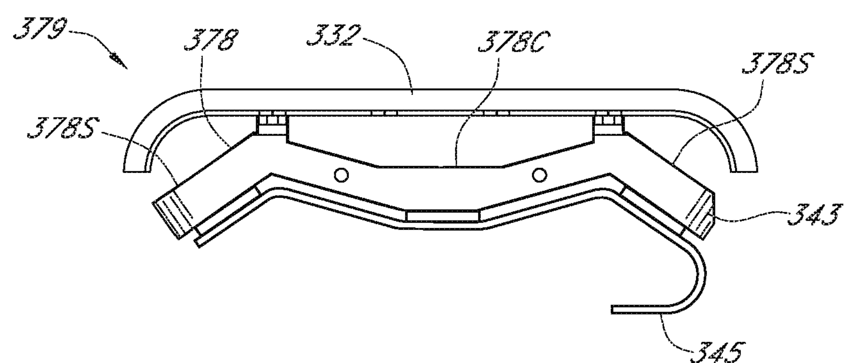
FIG. 18 is a top view of a passive infrared sensor assembly according to various aspects of the present disclosure.

With continued reference to FIG. 17, the mounting bracket 337 further comprises a bracket PCB 349. The bracket PCB 349 is situated outside the doorbell 330, and is therefore configured for various sensors that measure ambient conditions, such as an accelerometer 350, a barometer 351, a humidity sensor 352, and a temperature sensor 353 (FIG. 18). The functions of these components are discussed in more detail below. The bracket PCB 349 may be secured to the mounting bracket 337 with any suitable fasteners, such as screws, or interference connections, adhesives, etc.

With continued reference to FIG. 17, the faceplate 335 may extend from the bottom of the doorbell 330 up to just below the camera 334, and connect to the back plate 339 as described above. The lens 332 may extend and curl partially around the side of the doorbell 330. The enclosure 331 may extend and curl around the side and top of the doorbell 330, and may be coupled to the back plate 339 as described above. The camera 334 may protrude slightly through the enclosure 331, thereby giving it a wider field of view. The mounting bracket 337 may couple with the back plate 339 such that they contact each other at various points in a common plane of contact, thereby creating an assembly including the doorbell 330 and the mounting bracket 337. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 19:
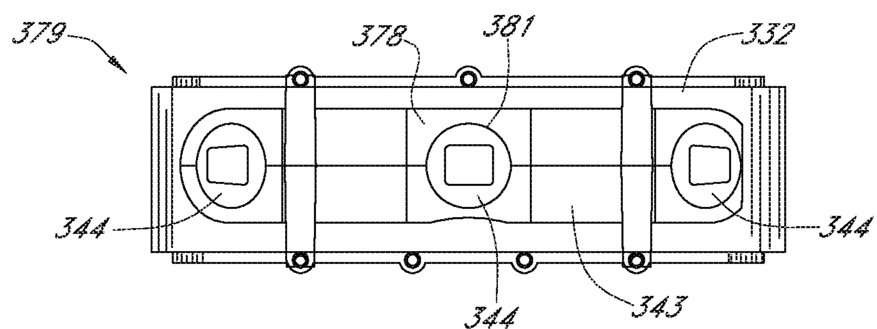
FIG. 19 is a front view of the passive infrared sensor assembly of FIG. 18.

FIG. 18 is a top view and FIG. 19 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 19, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 18, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 20:
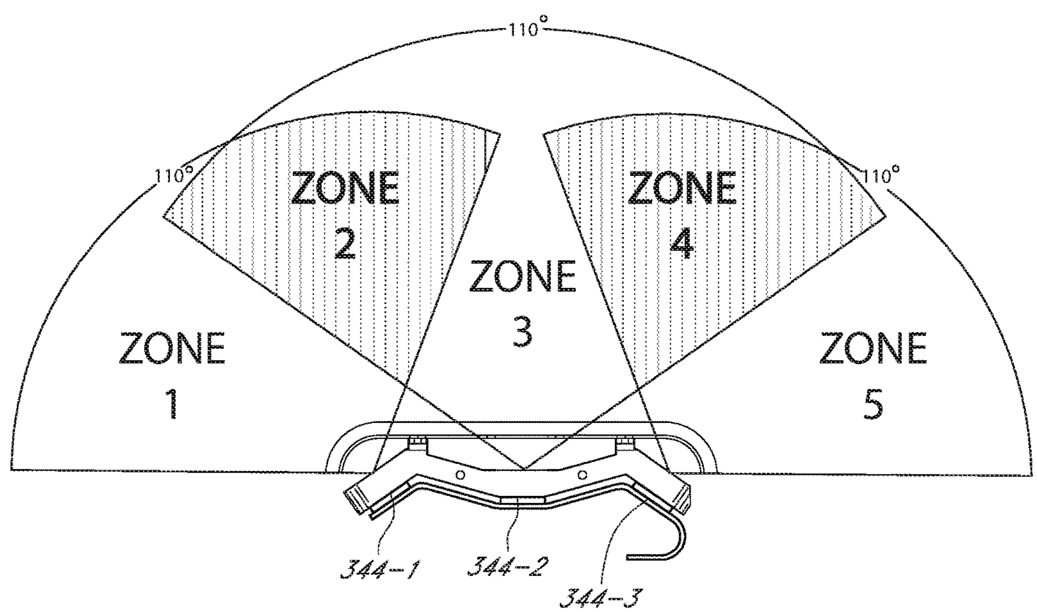
FIG. 20 is a top view of the passive infrared sensor assembly of FIG. 18, illustrating the fields of view of the passive infrared sensors according to various aspects of the present disclosure.

FIG. 20 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 21:
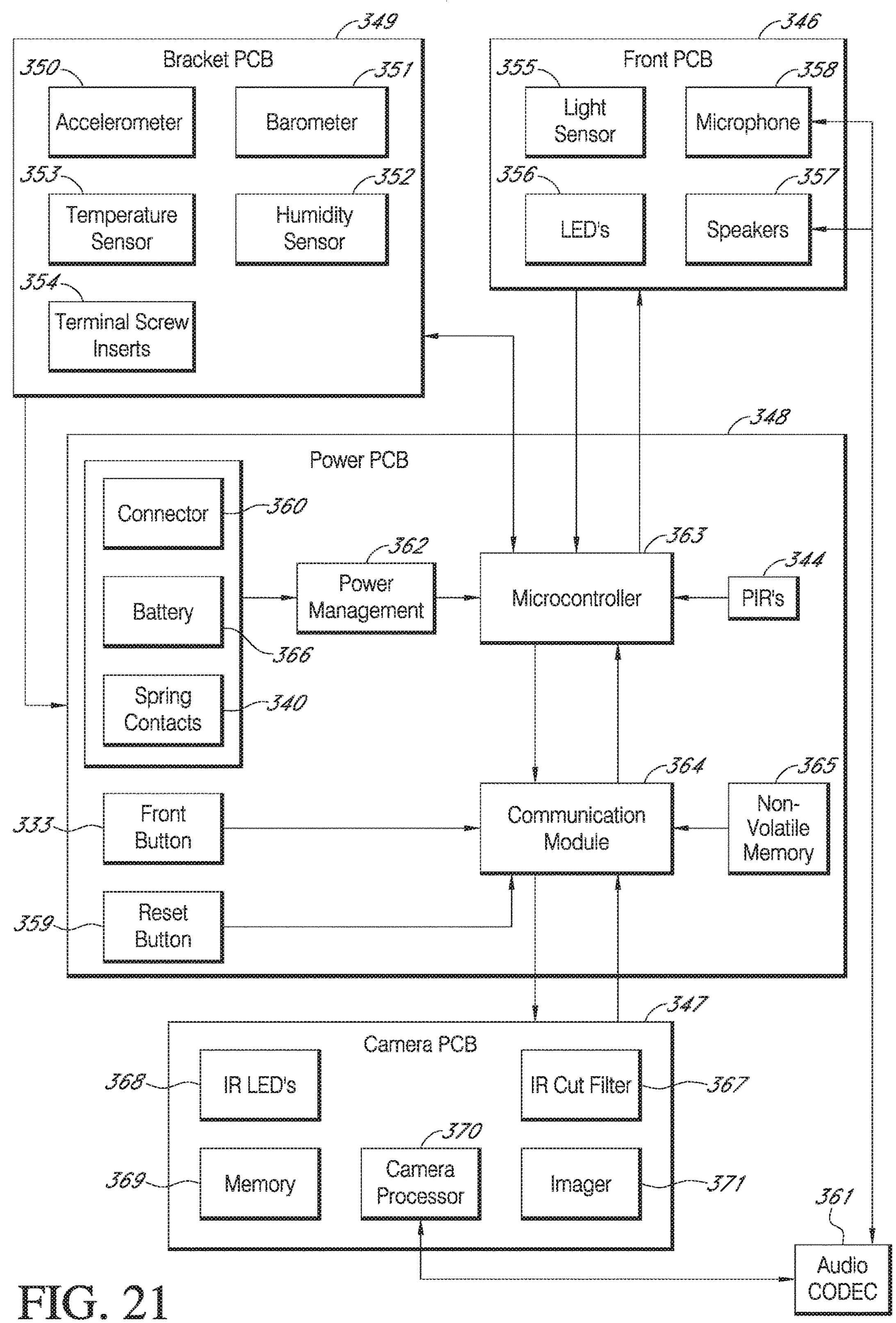
FIG. 21 is a functional block diagram of the components of the A/V recording and communication device of FIG. 14.

FIG. 21 is a functional block diagram of the components within or in communication with the doorbell 330, according to an aspect of the present embodiments. As described above, the bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. As described above, the bracket PCB 349 may be located outside the housing of the doorbell 330 so as to reduce interference from heat, pressure, moisture, and/or other stimuli generated by the internal components of the doorbell 330.

With further reference to FIG. 21, the bracket PCB 349 may further comprise terminal screw inserts 354, which may be configured to receive the terminal screws 338 and transmit power to the electrical contacts 377 on the mounting bracket 337 (FIG. 17). The bracket PCB 349 may be electrically and/or mechanically coupled to the power PCB 348 through the terminal screws 338, the terminal screw inserts 354, the spring contacts 340, and the electrical contacts 377. The terminal screws 338 may receive electrical wires located at the surface to which the doorbell 330 is mounted, such as the wall of a building, so that the doorbell can receive electrical power from the building's electrical system. Upon the terminal screws 338 being secured within the terminal screw inserts 354, power may be transferred to the bracket PCB 349, and to all of the components associated therewith, including the electrical contacts 377. The electrical contacts 377 may transfer electrical power to the power PCB 348 by mating with the spring contacts 340.

With further reference to FIG. 21, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electromechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 14). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114. When the user speaks, after being transferred through the network 112, digital audio data is decompressed by audio CODEC 361 and emitted to the visitor via the speakers 357.

With further reference to FIG. 21, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 21, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable night vision, as further described below. The microcontroller 363 may also act as a conduit for data communicated between various components and the communication module 364.

With further reference to FIG. 21, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 21, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the night vision function mentioned above.

Some of the present embodiments comprise computer vision for one or more aspects, such as object recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present A/V recording and communication device 130 may include a computer vision module 163. The computer vision module 163 may include any of the components (e.g. hardware) and/or functionality described herein with respect to computer vision, including, without limitation, one or more cameras, sensors, and/or processors. In some embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

One aspect of the present embodiments includes the realization that in current audio/video (A/V) recording and communication devices (e.g., doorbells) other than the present embodiments, users of said devices would benefit from as great a flexibility as possible regarding their options for setting notifications and alert tones. Further, users would benefit from the capability to set different alert tones, and have their A/V recording and communication devices assume different operational modes, and thus perform different tasks, or provide different alerts, depending upon whether the user is present or absent from the home (or other location where the A/V recording and communication device is installed). Still further, users would benefit from the capability to set different operational modes when secondary users, such as a spouse or child, are home alone, and to receive different notifications and/or alert tones when their loved ones are home alone.

Figure 22:
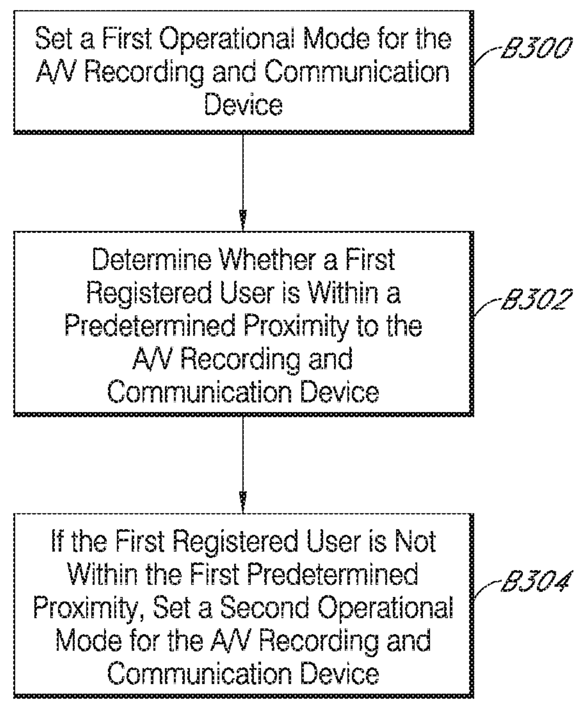
FIG. 22 is a flowchart showing aspects of one embodiment of a method disclosed herein.
Figure 23:
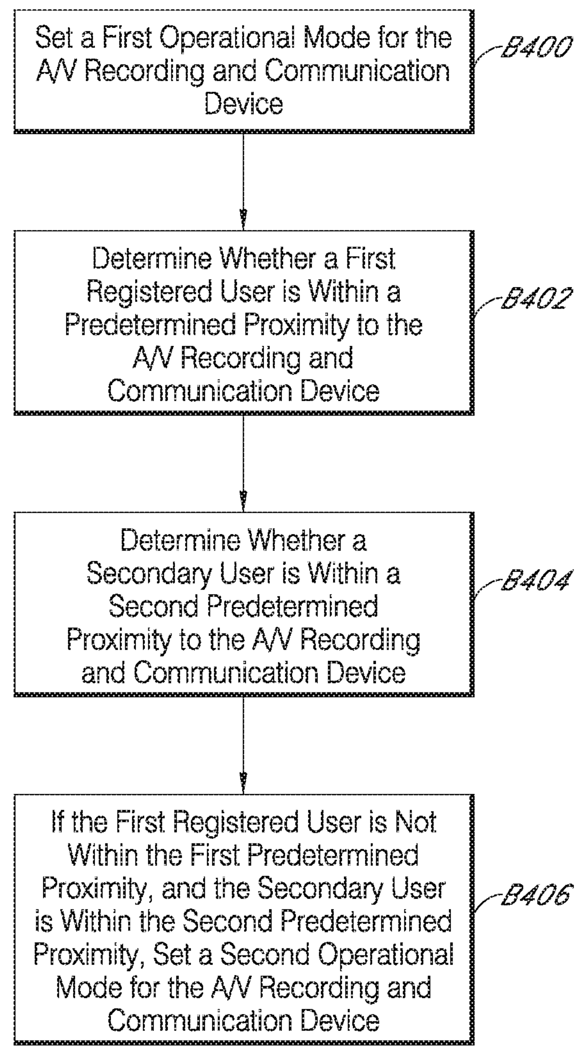
FIG. 23 is a flowchart showing certain steps in aspects of another embodiment of a method disclosed herein.
Figure 24:
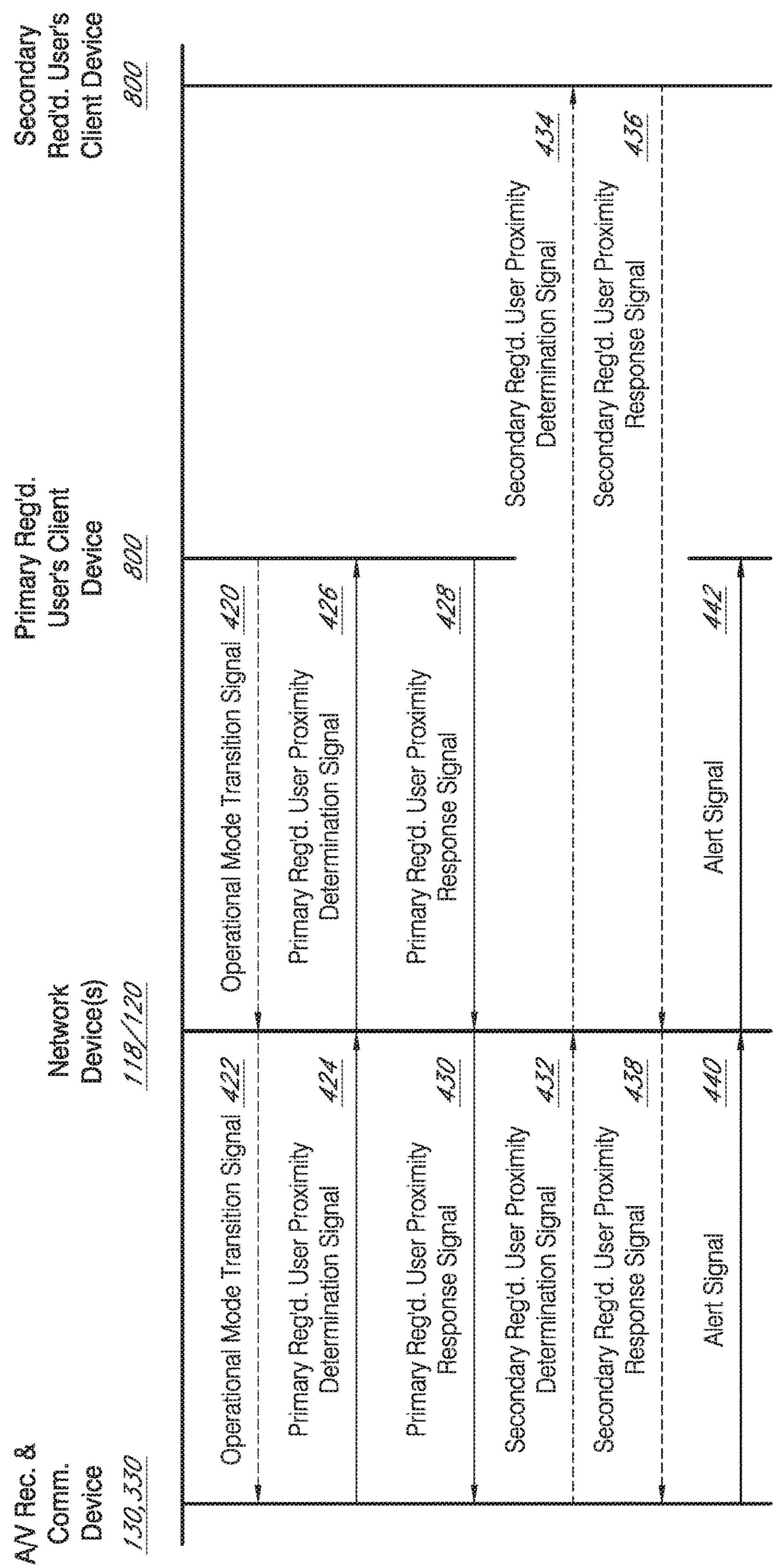
FIG. 24 is a sequence diagram illustrating communication signals sent and received among various devices according to various aspects of the present disclosure.

With reference to FIGS. 22-24, to address the foregoing shortcomings of A/V recording and communication devices, such devices may be designed and/or programmed to execute the processes and/or functions described below, either alone, in conjunction with one or more wireless client devices, such as one or more smartphones, and/or in conjunction with one or more other linked A/V recording and communication devices, and/or in conjunction with one or more backend devices including, but not limited to, servers and API's, with communication via suitable channels, including long-range wireless channels (e.g., cellular communication channels), mid-range wireless channels (e.g., Wi-Fi), short-range wireless channels (e.g., Bluetooth), wired channels (e.g., Ethernet), etc.

In a first aspect, a method according to the present embodiments includes the ability to set one or more different operational modes for the A/V recording and communication devices 130, depending upon the location of the registered user. For example, with reference to FIG. 22, the method may comprise setting a first operational mode at block B300 for the A/V recording and communication device 130. The A/V recording and communication device 130 then determines, at block B302, whether a registered user of the A/V recording and communication device is within a predetermined proximity of the A/V recording and communication device. Upon determining that the registered user of the A/V recording and communication device is not within the predetermined proximity of the A/V recording and communication device 130, the device sets a second operational mode for the A/V recording and communication device at block B304. In some embodiments, the first operational mode is a normal, unarmed, or at-home mode, while the second operational mode is an armed or away-from-home mode. In certain embodiments below, the second operational mode is a heightened security mode.

The present disclosure is not limited to the setting of only two operational modes. The present disclosure contemplates that a plurality of different operational modes, different alert tones, and/or automated actions, may be programmed and/or set, depending upon the needs and desires of the registered user.

In some embodiments, the A/V recording and communication device 130, 330 includes a camera 154, 334 and/or a motion sensor 344, and a speaker 152, 357. One method contemplates using the camera 154, 334 and/or the motion sensor 344 to detect motion within a field of view of the A/V recording and communication device 130, 330 to detect the presence of a person, whether it is an expected visitor, an unexpected visitor, a solicitor, a neighbor, a burglar, etc. The A/V recording and communication device 130, 330 may then either transition from a current operational mode to another operational mode, or if a certain operational mode has been set, take certain actions that are different than actions that would be taken in a different operational mode. For example, upon detection of motion within the field of view of the A/V recording and communication device 130, 330, the A/V recording and communication device 130, 330 may automatically play an audio alert from the speaker 152, 357 that can be heard by the person in the field of view of the A/V recording and communication device 130, 330. This audio alert may take any form desired, ranging from a siren or bell, to a recorded voice politely asking the person to state their business, to a warning that police have been contacted and are en route. In an “at-home” operational mode, when the registered user is present and is expecting a visitor, the audio alert may be a polite greeting. However, in a second “away” or “nighttime” operational mode, when the registered user is not present, not expecting a visitor, and/or it is nighttime, the audio alert may be more aggressive or in the nature of a warning not to approach the property. It is contemplated that such an audio alert, which is made so that the visitor can hear the audio alert, will reduce incidences of burglary and/or unauthorized visitors. This embodiment may further include electronic components and software to enable multiple A/V recording and communication devices 130, 330 to be operatively linked, such as via a backend API, such as, for example, when a homeowner installs a separate A/V recording and communication device 130, 330 at each entry point to a home. This operative linkage then allows an audio alert to be played on all linked A/V recording and communication devices 130, 330 when motion is detected on any one of the A/V recording and communication devices 130, 330. This functionality increases the likelihood that unwanted intruders will hear the warning, and also may increase the likelihood that unwanted intruders will flee upon hearing the warning.

The determination of whether the registered user is within a particular proximity to the A/V recording and communication device 130, 330 can be accomplished in a number of different ways, and the following description is not intended to be limiting. In one embodiment, the proximity of the registered user may be determined by registering a wireless client device 800 associated with the registered user to the A/V recording and communication device 130, 330. This registration is often accomplished at the time that the A/V recording and communication device 130, 330 is first set-up and installed, but it could be performed at any time. Then, the A/V recording and communication device 130, 330 may determine whether the registered wireless client device 800 is within the predetermined proximity of the A/V recording and communication device 130, 330. The wireless client device 800 may be, for example, a smartphone, a wearable device, a tablet, a phablet, or any other known computing and communication device from which location information can be determined, either directly or indirectly.

For example, in certain embodiments, the wireless client device 800, such as a smartphone, may have built-in GPS (Global Positioning System) components for generating location information and determining the location of the wireless client device 800. This GPS location information can be transmitted from the wireless client device, through an application program ("app"), directly or indirectly to the A/V recording and communication device 130, 330, or to a backend API. Similarly, location information can be determined for the A/V recording and communication device 130, 330. The location information for the A/V recording and communication device 130, 330 can be generated based on a GPS location system in the A/V recording and communication device itself, or may be based on the location where the device has been installed, as provided by the registered user to a backend API during a set-up process of the A/V recording and communication device 130, 330. The location information of the wireless client device 800 and the location information of the A/V recording and communication device 130, 330 can then be compared, either substantially continuously, or at regular intervals, such as every minute, every two minutes, every five minutes, or intervals of any other length, or at irregular intervals. This comparison evaluates whether the registered wireless client device 800 is within some predetermined proximity to the A/V recording and communication device 130, 330. The predetermined proximity may be set by a user, or set as a default upon set-up. The predetermined proximity may be a distance that is such that, when a registered user's wireless client device 800 is within or close to the property being protected by the A/V recording and communication device 130, 330, the registered user can be understood to be "at home." As such, this predetermined proximity value may vary depending upon the type of property (e.g., a city apartment versus a multi-acre rural home), the neighborhood, and/or the user's preferences. That said, this predetermined proximity value may be, for example, 50 feet, 100 feet, 200 feet, 400 feet, etc.

Other embodiments may use signals sent and received directly between the wireless client device 800 to the A/V recording and communication device 130, 330 to determine proximity. In one embodiment, the A/V recording and communication device 130, 330 may have a receiver for receiving Bluetooth signals, including but not limited to one or more Bluetooth Low Energy beacons. The A/V recording and communication device 130, 330 in such embodiments can be programmed to recognize that when a Bluetooth signal is received from a registered wireless client device 800, including a Bluetooth signal that is stronger than a particular threshold value, that the registered wireless client device is within range and therefore within a predetermined proximity to the A/V recording and communication device 130, 330. Alternatively, the A/V recording and communication device 130, 330 can be configured to transmit Bluetooth signals, including but not limited to Bluetooth Low Energy beacons, and upon receipt by a registered wireless client device 800, and a recognition that the received Bluetooth signal is stronger than a particular threshold value, an app executing on the registered wireless client device may report to a backend API that the registered wireless client device 800 is within the predetermined proximity to the A/V recording and communication device 130, 330. Similarly, in other embodiments, proximity can be recognized when the A/V recording and communication device 130, 330 and the registered wireless client 800 are in communication with the same 802.11 Wi-Fi network (or other wireless network) or the same 802.3 Ethernet network (or other wired network), if the wireless client device 800 is plugged in.

Other embodiments may use the camera 154, 334, in combination with computer vision, facial recognition, and/or other biometrics, to determine whether the registered user of the A/V recording and communication device 130, 330 is within the predetermined proximity of the A/V recording and communication device 130, 330. Such embodiments may allow uploading of first image data, such as a digital photograph of the registered user, to a database that is accessible to the A/V recording and communication device 130, 330. The user may then provide other identifying information, such as additional images, biometric information, and/or the location of the installed A/V recording and communication device 130, 330. The A/V recording and communication device 130, 330 may be programmed to receive second image data, for example of a person within a field of view of the camera 154, 334, such as an image of the person's face as they approach the A/V recording and communication device 130, 330, and determine, by comparing the first image data and the second image data, whether the person is the registered user. In some embodiments, the first image data comprises first biometric data and the second image data comprises second biometric data.

In one embodiment, when the A/V recording and communication device 130, 330 is in the heightened security mode, the camera 154, 334 continuously records video images and, upon detecting any motion in the field of view of the camera 154, 334 or the motion sensor 344, sends an alert to the wireless client device 800. Upon receiving the alert, an application executing in the wireless client device 800 may play an audible tone and/or enable the near-real time viewing of the recorded video images. In another embodiment, the audible tone may be uniquely associated with a severity of the alert. For example, particular pitches, patterns, volumes, and/or ringtones may be selected by the registered user, or set as defaults, to indicate that the A/V recording and communication device 130, 330 has entered a second operational mode, has detected movement (either with the camera 154, 334 or with the motion sensor 344), has had an actuation of the doorbell button, or other events such as those described herein.

With reference to FIG. 23, in another aspect a method is provided for an audio/video (A/V) recording and communication device 130, 330 to set different operational modes and take different actions based upon the presence or absence of both a registered user and one or more secondary users of the A/V recording and communication device 130, 330. In one embodiment, the method comprises setting a first operational mode for the A/V recording and communication device at block B400, determining whether a primary registered user of the A/V recording and communication device is within a predetermined proximity of the A/V recording and communication device at block B402, determining whether at least one secondary registered user of the A/V recording and communication device is within the predetermined proximity of the A/V recording and communication device at block B404, and upon determining that the primary registered user is outside of the predetermined proximity and that the at least one secondary registered user is inside the predetermined proximity, setting a second operational mode for the A/V recording and communication device at block B406. Such a method may be beneficial to a registered user who desires to have his A/V recording and communication device 130, 330 be in a heightened security mode when he or she is away from home, but a secondary registered user, such as a spouse or child, is at home.

Approaches and techniques for determining the presence and proximity of the registered user to the A/V recording and communication device 130, 330, and setting different operational modes and actions, are discussed above. Similar approaches and techniques may be employed to determine the presence and/or proximity of one or more secondary users. The determination regarding the presence, absence, or proximity of the primary registered user, as well as the determination regarding the presence, absence, or proximity of the secondary registered user, may then be used in a variety of combinations to set various operational modes and actions.

In a still further embodiment, a second wireless client device 800 may include an RFID chip. Such an embodiment may be useful where the secondary user is a minor child who does not otherwise possess a smartphone, tablet, or other wireless device, but the child's parent, who is the primary registered user, desires to be able to set different operational modes depending upon the child's proximity to the A/V recording and communication device 130, 330. As such, an RFID chip may be associated with the secondary user. This may be accomplished in any number of ways, such as by attaching the RFID chip to a wearable device, to the child's favorite toy (e.g., the child's security blanket or favorite stuffed animal), or to a regularly worn article of the child's clothing (e.g., the child's favorite sneakers or a winter coat). In some embodiments, more than one RFID chip could be used for this approach.

In another embodiment, the method further comprises generating and transmitting an alert to a security monitoring company if certain actions occur while the A/V recording and communication device 130, 330 is in the second operational mode. For example, if, while the A/V recording and communication device 130, 330 is in the heightened second operational mode and the doorbell button is depressed, the A/V recording and communication device 130, 330 and all other A/V recording and communication devices 130, 330 installed on the same property may immediately begin recording video, and may further transmit an alert to the registered user. This alert may be generated and transmitted by the A/V recording and communication device 130, 330, by the wireless client device 800, in combination with an app, or by the backend API.

In another embodiment, different operational modes may be set and/or different actions may be taken based on the actions of persons who may be, or who may appear to be, suspicious. For example, a heightened security operational mode may be set if the same visitor returns, or loiters, in the field of view of the camera 154, 334, particularly while the registered user is outside of a predetermined proximity of the A/V recording and communication device 130, 330, and/or while a secondary user is within a predetermined proximity of the A/V recording and communication device 130, 330. It should be noted that the predetermined proximity associated with the registered user can be different than the predetermined proximity associated with each of the one or more secondary users. Such a method may be desired and beneficial for notifying the registered user when a particular visitor is repeatedly visiting the home while they are not present. While not limiting, such scenarios could include repeat visits of an undesirable friend of a minor child, a paramour of a faithless spouse, or an intimidating door-to-door solicitor determined to take advantage of an elderly parent living at the home. Further, the present disclosure may be combined with and hereby incorporates by reference, as if fully set forth herein, the disclosure of previously filed U.S. Provisional Patent Application Ser. No. 62/464,342, entitled IDENTIFICATION OF SUSPICIOUS PERSONS USING AUDIO/VIDEO RECORDING AND COMMUNICATION DEVICES.

FIG. 24 is a sequence diagram illustrating communication signals sent and received among various devices according to various aspects of the present disclosure. As described above, a primary registered user may set an operational mode for the A/V recording and communication device 130, 330 using an application executing on the primary registered user's client device 800. In some embodiments, this process may include the primary registered user's client device 800 sending an operational mode transition signal 420 to one or more backend network devices, such as one or more servers 118 and/or one or more APIs 120 (FIG. 1). In response to receiving the operational mode transition signal 420, the network device(s) 118, 120 may similarly send an operational mode transition signal 422 to the A/V recording and communication device 130, 330. In alternative embodiments, the primary registered user's client device 800 may send the operational mode transition signal 420 directly to the A/V recording and communication device 130, 330 using a short-range communication protocol, such as Bluetooth or Bluetooth LE, rather than sending the signal through the backend.

In some embodiments, the primary registered user may set the operational mode of the A/V recording and communication device 130, 330 manually. For example, the primary registered user, upon arriving home, may manually change the operational mode of the A/V recording and communication device 130, 330 from the away mode to the at-home mode. Conversely, the primary registered user, as he or she is leaving home, may manually change the operational mode of the A/V recording and communication device 130, 330 from the at-home mode to the away mode. In other embodiments, the operational mode of the A/V recording and communication device 130, 330 may be changed automatically, such as according to an established schedule. For example, the primary registered user may set an operational mode transition schedule for the A/V recording and communication device 130, 330, such as scheduling the A/V recording and communication device 130, 330 to be in away mode every Monday through Friday between 3:00 PM and 7:00 PM, and in at-home mode at all other times, unless manually switched to away mode. If the primary registered user sets an operational mode transition schedule for the A/V recording and communication device 130, 330, then in such embodiments the operational mode transition signal 420 from the primary registered user's client device 800 to the backend network device(s) 118, 120 would not be sent every time the A/V recording and communication device 130, 330 transitions from one operational mode to another. Rather, the backend network device(s) 118, 120 would send the operational mode transition signal 422 to the A/V recording and communication device 130, 330 each time an operational mode transition was scheduled, according to the schedule set by the primary registered user. In alternative embodiments, the operational mode transition schedule could be managed locally by the A/V recording and communication device 130, 330, such that the backend network device(s) 118, 120 would not need to send the operational mode transition signal 422 to the A/V recording and communication device 130, 330 each time an operational mode transition was scheduled.

In still further embodiments, the A/V recording and communication device 130, 330 may set an operational mode based on observed conditions, rather than in response from an operational mode transition signal from either the backend network device(s) 118, 120 or the primary registered user's client device 800. Examples of observed conditions that might trigger an operational mode transition are discussed above, such as detecting that the primary registered user is home or not home (e.g., the primary registered user is within a predetermined proximity of the A/V recording and communication device 130, 330 or not within the predetermined proximity), and/or detecting that one or more secondary users are home or not home (e.g., the secondary user(s) is/are within a predetermined proximity of the A/V recording and communication device 130, 330 or not within the predetermined proximity).

With further reference to FIG. 24, the A/V recording and communication device 130, 330 may send a primary registered user proximity determination signal 424 to the backend network device(s) 118, 120. In response to receiving the primary registered user proximity determination signal 424, the network device(s) 118, 120 may similarly send a primary registered user proximity determination signal 426 to the primary registered user's client device 800. In alternative embodiments, the A/V recording and communication device 130, 330 may send the primary registered user proximity determination signal 424 directly to the primary registered user's client device 800 using a short-range communication protocol, such as Bluetooth or Bluetooth LE, rather than sending the signal through the backend.

In response to receiving the primary registered user proximity determination signal 426, the primary registered user's client device 800 may send a primary registered user proximity response signal 428 to the backend network device(s) 118, 120. In response to receiving the primary registered user proximity response signal 428, the network device(s) 118, 120 may similarly send a primary registered user proximity response signal 430 to the A/V recording and communication device 130, 330. In alternative embodiments, such as those in which the primary registered user's client device 800 receives the primary registered user proximity determination signal 424 directly from the A/V recording and communication device 130, 330, the primary registered user's client device 800 may send the primary registered user proximity response signal 428 directly to the A/V recording and communication device 130, 330 using a short-range communication protocol, such as Bluetooth or Bluetooth LE, rather than sending the signal through the backend.

With further reference to FIG. 24, in some embodiments the A/V recording and communication device 130, 330 may send a secondary registered user proximity determination signal 432 to the backend network device(s) 118, 120. In response to receiving the secondary registered user proximity determination signal 432, the network device(s) 118, 120 may similarly send a secondary registered user proximity determination signal 434 to the client device(s) 800 of one or more secondary users. In alternative embodiments, the A/V recording and communication device 130, 330 may send the secondary registered user proximity determination signal 432 directly to the client device(s) 800 of the one or more secondary users using a short-range communication protocol, such as Bluetooth or Bluetooth LE, rather than sending the signal through the backend.

In response to receiving the secondary registered user proximity determination signal 432, the client device(s) 800 of the one or more secondary users may send a secondary registered user proximity response signal 436 to the backend network device(s) 118, 120. In response to receiving the secondary registered user proximity response signal 436, the network device(s) 118, 120 may similarly send a secondary registered user proximity response signal 438 to the A/V recording and communication device 130, 330. In alternative embodiments, such as those in which the client device(s) 800 of the one or more secondary users receive the secondary registered user proximity determination signal 432 directly from the A/V recording and communication device 130, 330, the client device(s) 800 of the one or more secondary users may send the secondary registered user proximity response signal 436 directly to the A/V recording and communication device 130, 330 using a short-range communication protocol, such as Bluetooth or Bluetooth LE, rather than sending the signal through the backend.

With further reference to FIG. 24, in response to receiving the primary registered user proximity response signals 428, 430 and/or the secondary registered user proximity response signals 436, 438, the A/V recording and communication device 130, 330 may determine whether the primary registered user and/or the one or more secondary registered user(s) are located within the predetermined proximity to the A/V recording and communication device 130, 330 and, based on the determination, the A/V recording and communication device 130, 330 may send an alert signal 440 to the backend network device(s) 118, 120. In response to receiving the alert signal 440, the network device(s) 118, 120 may similarly send an alert signal 442 to the primary registered user's client device 800. Examples of circumstances that might cause the A/V recording and communication device 130, 330 to send the alert signal 440 to the backend network device(s) 118, 120 (and cause the network device(s) 118, 120 to send the alert signal 442 to the primary registered user's client device 800) are discussed above. These examples include detecting that the primary registered user is not home (e.g., the primary registered user is not within the predetermined proximity), and/or detecting that one or more secondary users are home (e.g., the secondary user(s) is/are within a predetermined proximity of the A/V recording and communication device 130, 330), and also detecting one or more other conditions, such as a visitor approaching the A/V recording and communication device 130, 330, or a suspicious person loitering or repeatedly passing by the A/V recording and communication device 130, 330, etc.

With still further reference to FIG. 24, the arrows corresponding to the operational mode transition signals 420, 422, the secondary registered user proximity determination signals 432, 434, and the secondary registered user proximity response signals 436, 438 are represented with broken lines, indicating that these signals may not be included in some of the present embodiments. Further, although the arrows corresponding to the secondary registered user proximity determination signals 432, 434 are located beneath the arrows corresponding to the primary registered user proximity determination signals 424, 426, it is to be understood that in some embodiments the secondary registered user proximity determination signals 432, 434 may be sent at substantially the same time as the primary registered user proximity determination signals 424, 426.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, 330, but without the front button 148, the button actuator 228, and/or the light pipe 232.

Figure 25:
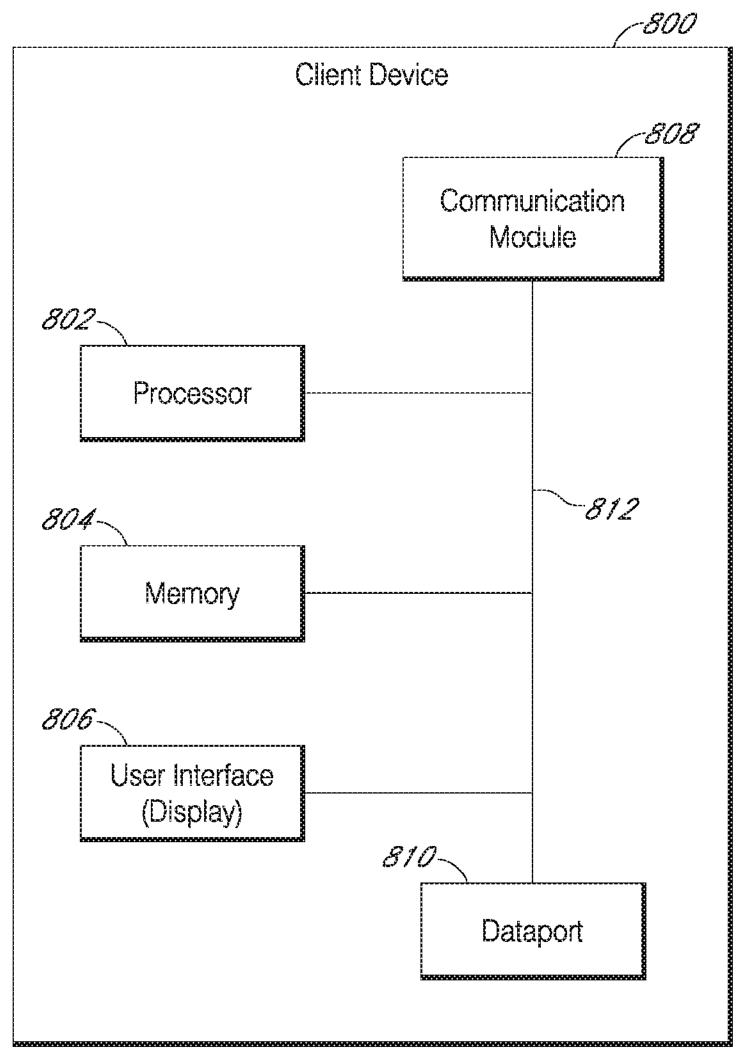
FIG. 25 is a functional block diagram of a client device on which the present embodiments may be implemented according to various aspects of the present disclosure.

FIG. 25 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 25, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 26:
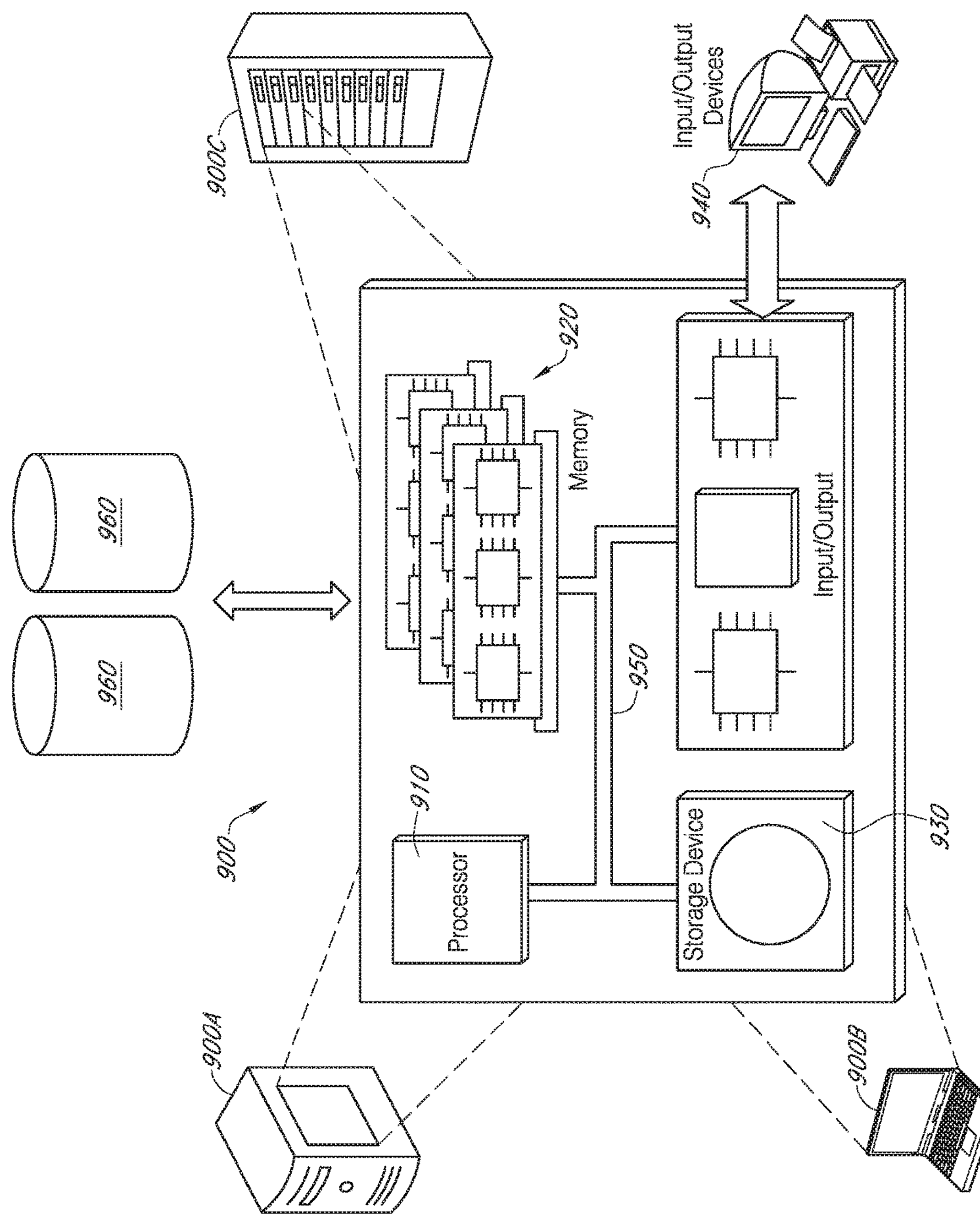
FIG. 26 is a functional block diagram of a general-purpose computing system on which the present embodiments may be implemented according to various aspects of present disclosure.

FIG. 26 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:

setting a first security mode for an electronic device;

determining that a client device associated with the electronic device is outside of a predetermined proximity of the electronic device;

after determining that the client device is outside of the predetermined proximity, setting a second security mode for the electronic device, the second security mode being different than the first security mode;

while in the second security mode, detecting possible motion in a field of view of the electronic device; and sending, to a remote system, data indicating that the possible motion was detected.

2. The method of claim 1, further comprising receiving data associated with registering the client device with the electronic device.

3. The method of claim 1, wherein determining that the client device is outside of the predetermined proximity of the electronic device comprises:
determining a first location of the electronic device;
receiving additional data indicating a second location of the client device; and
determining that the second location is outside of the predetermined proximity of the first location.

4. A method comprising:
setting a first operational mode for an electronic device;
while in the first operational mode, generating first image data using a camera of the electronic device;
determining that a client device associated with the electronic device is within a predetermined proximity of the electronic device;
after determining that the client device is within the predetermined proximity of the electronic device, setting a second operational mode for the electronic device; and
while in the second operational mode, forgoing generating second image data using the camera.

5. The method of claim 4, further comprising receiving registration data associated with registering the client device with the electronic device.

6. The method of claim 4, wherein determining that the client device is within the predetermined proximity of the electronic device comprises:
determining a first location of the electronic device;
receiving location data indicating a second location of the client device; and
determining that the second location is within the predetermined proximity of the first location.

7. The method of claim 4, wherein determining that the client device is within the predetermined proximity of the electronic device comprises:
receiving a signal from the client device; and
after receiving the signal, determining that the client device is within the predetermined proximity of the electronic device.

8. The method of claim 4, wherein the client device is a first client device, and wherein the method further comprises:
determining that a second client device is outside of the predetermined proximity of the electronic device;
after determining that the second client device is outside of the predetermined proximity of the electronic device, setting a third operational mode for the electronic device;
receiving an input associated with a doorbell; and
transmitting, to a remote system, input data indicating the input.

9. An electronic device, comprising:
a communication interface;
one or more processors; and
one or more non-transitory computer-readable media storing instructions that, when executed by the one or more processors, cause the one or more processors to perform operations comprising:
setting a first operational mode for the electronic device;
while in the first operational mode, detecting first possible motion;
transmitting, using the communication interface and to a remote system, first data indicating the first possible motion;
determining that a client device is within a predetermined proximity of the electronic device;
after determining that the client device is within the predetermined proximity of the electronic device, setting a second operational mode for the electronic device;
while in the second operational mode, detecting second possible motion; and
forgoing from transmitting second data indicating the second possible motion.

10. The electronic device of claim 9, the one or more non-transitory computer-readable media storing further instructions that, when executed by the one or more processors, cause the one or more processors to perform further operations comprising receiving, using the communication interface, third data associated with registering the client device with the electronic device.

11. The electronic device of claim 9, wherein determining that the client device is within the predetermined proximity of the electronic device comprises:
determining a first location of the electronic device;
receiving, using the communication interface, third data representing a second location of the client device; and
determining that the second location is within the predetermined proximity of the first location.

12. The electronic device of claim 9, wherein determining that the client device is within the predetermined proximity of the electronic device comprises:
receiving, using the communication interface, a signal from the client device; and
after receiving the signal, determining that the client device is within the predetermined proximity of the electronic device.

13. The electronic device of claim 9, further comprising:
a camera,
and wherein determining that the client device is within the predetermined proximity of the electronic device comprises:
receiving, using the communication interface, first image data representing a user associated with the client device;
generating, using the camera, second image data representing a field of view of the camera; and
determining, using the first image data, that the second image data represents the user.

14. The method of claim 1, further comprising:
determining that the client device is within the predetermined proximity of the electronic device; and
after determining that the client device is within the predetermined proximity, setting the first security mode for the electronic device.

15. The method of claim 1, further comprising:
determining that an additional client device associated with the electronic device is within the predetermined proximity of the electronic device,
wherein setting the second security mode for the electronic device also occurs after determining that the additional client device is within the predetermined proximity of the electronic device.

16. The method of claim 1, further comprising:
while in the first security mode, forgoing from generating first image data using a camera of the electronic device; and
while in the second security mode, generating second image data using the camera.

17. The method of claim 4, further comprising:
determining that an additional client device associated with the electronic device is outside of the predetermined proximity of the electronic device, wherein setting the second operational mode also occurs after determining that the additional client device is outside of the predetermined proximity of the electronic device.

18. The method of claim 4, further comprising:

while in the first operational mode, detecting first possible motion by the electronic device;

transmitting, to a remote system, first data indicating the first possible motion;

while in the second operational mode, detecting second possible motion by the electronic device; and forgoing transmitting second data indicating the second possible motion.

19. The electronic device of claim 9, further comprising a camera, and wherein the one or more non-transitory computer-readable media store further instructions that, when executed by the one or more processors, cause the one or more processors to perform further operations comprising:

while in the first operational mode, generating first image data using the camera; and while in the second operational mode, forgoing generating second image data using the camera.

20. The method of claim 1, further comprising:

while in the first security mode, detecting additional possible motion in the field of view of the electronic device; and forgoing from transmitting, to the remote system, additional data indicating that the additional possible motion was detected.

21. The method of claim 1, further comprising:

determining that an additional client device is outside of the predetermined proximity of the electronic device; and after determining that the additional client device is outside of the predetermined proximity of the electronic device, setting a third security mode for the electronic device.

22. The electronic device of claim 9, the one or more non-transitory computer-readable media storing further instructions that, when executed by the one or more processors, cause the one or more processors to perform further operations comprising:

determining that an additional client device is outside of the predetermined proximity of the electronic device; and after determining that the additional client device is outside of the predetermined proximity of the electronic device, setting a third operational mode for the electronic device.

23. The method of claim 1, further comprising:

while in the first security mode, outputting a first sound using at least one speaker of the electronic device; and while in the second security mode, outputting a second sound using the at least one speaker.

* * * * *